United States Patent
Tobias et al.

(10) Patent No.: US 11,174,026 B2
(45) Date of Patent: *Nov. 16, 2021

(54) AIRCRAFT STORE EJECTOR SYSTEM

(71) Applicant: Marvin Engineering Company, Inc., Inglewood, CA (US)

(72) Inventors: Lee Allen Tobias, Laguna Niguel, CA (US); Sohrab John Talebian, Beverly Hills, CA (US); Robert Ronald Evans, Middlesex (GB)

(73) Assignee: MARVIN ENGINEERING CO., INC., Inglewood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,685

(22) Filed: Aug. 22, 2019

(65) Prior Publication Data

US 2020/0148357 A1    May 14, 2020

Related U.S. Application Data

(63) Continuation of application No. 15/194,273, filed on Jun. 27, 2016, now Pat. No. 10,427,787, which is a
(Continued)

(51) Int. Cl.
*B64D 1/12* (2006.01)
*B64D 1/06* (2006.01)
(Continued)

(52) U.S. Cl.
CPC .................. *B64D 1/12* (2013.01); *B64D 1/06* (2013.01); *F15B 1/26* (2013.01); *F15B 15/16* (2013.01);
(Continued)

(58) Field of Classification Search
CPC ....... F41F 3/06; F41F 3/065; Y10T 137/7793; Y10T 137/469; Y10T 137/4857;
(Continued)

(56) References Cited

U.S. PATENT DOCUMENTS 2,937,899 A    3/1960   Murphy
2,933,070 A    4/1960   Trumper et al.
(Continued)

FOREIGN PATENT DOCUMENTS

FR        2947320 A1    12/2010

OTHER PUBLICATIONS

PCT International Search Report and Written Opinion from corresponding PCT Application No. PCT/US2012/050302, dated Jul. 8, 2013.
(Continued)

*Primary Examiner* — Michael R Reid
(74) *Attorney, Agent, or Firm* — Knobbe, Martens, Olson & Bear, LLP

(57) ABSTRACT

An aircraft store ejector systems and subsystems thereof. Embodiments can include a two-reservoir re-pressurization system wherein a remote reservoir is used to maintain desired pressure in a local ejector reservoir. The system can include a release valve having a vent valve and valve piston. The release valve can control release of pressurized gas to a pitch control valve. The pitch control valve can be configured to distribute the pressurized gas between two or more ejector piston assemblies. One or more of the ejector piston assemblies can include multiple concentric piston stages and piston chambers, the piston chambers configured to contain a volume of gas. The ejector piston assemblies can be configured to compress the volume of gas within the piston chambers as the piston stages are extended out from the aircraft. Such compression can provide a return force to the piston stages.

21 Claims, 19 Drawing Sheets

Related U.S. Application Data continuation of application No. 13/572,560, filed on Aug. 10, 2012, now Pat. No. 9,376,209.

(60) Provisional application No. 61/575,850, filed on Aug. 30, 2011.

(51) Int. Cl.
  *F15B 1/26* (2006.01)
  *F15B 15/16* (2006.01)

(52) U.S. Cl.
  CPC ...... *Y10T 137/469* (2015.04); *Y10T 137/7793* (2015.04)

(58) Field of Classification Search
  CPC ......... Y10T 137/6855; Y10T 137/6906; Y10T 137/6914; B64D 1/02; B64D 1/04; B64D 1/06; B64D 1/08; B64D 1/12; B64D 1/16; B64D 7/08; B64D 1/18; B64D 1/20
  USPC .................. 137/899, 899.2, 899.4, 256, 266; 89/1.54; 244/136, 137, 137.4; 294/82.26, 82.36
  See application file for complete search history.

(56) References Cited

U.S. PATENT DOCUMENTS

| | | | |
|---|---|---|---|
| 2,997,057 A | 8/1961 | Toth | |
| 3,685,925 A | 8/1972 | McJones | |
| 3,756,545 A | 9/1973 | Coutin | |
| 3,797,366 A | 3/1974 | Hanes et al. | |
| 3,871,604 A | 3/1975 | Coutin | |
| 4,008,648 A | 2/1977 | Farmer et al. | |
| 4,043,525 A | 8/1977 | Jakubowski | |
| 4,075,929 A | 2/1978 | Peterson | |
| 4,246,472 A | 1/1981 | Sun | |
| 4,388,853 A | 6/1983 | Griffin et al. | |
| 4,441,674 A | 4/1984 | Holtrop | |
| 4,523,512 A | 6/1985 | Hessel et al. | |
| 4,552,327 A | 11/1985 | Carter | |
| 4,905,568 A | 3/1990 | Hetzer | |
| 5,322,004 A | 6/1994 | Sims | |
| 5,583,312 A | 12/1996 | Jakubowski | |
| 5,907,118 A | 5/1999 | Jakubowski | |
| 5,932,829 A | 8/1999 | Jakubowski | |
| 6,009,788 A | 1/2000 | Jakubowski | |
| 6,119,982 A | 9/2000 | Jakubowski et al. | |
| 6,152,015 A | 11/2000 | Migliori | |
| 6,347,768 B1 | 2/2002 | Jakubowski | |
| 6,481,669 B1 | 11/2002 | Griffin | |
| 6,655,658 B2 | 12/2003 | Neal et al. | |
| 6,675,825 B1 | 1/2004 | Reeves et al. | |
| 6,676,083 B1 | 1/2004 | Foster | |
| 6,758,441 B2 | 7/2004 | Jakubowski | |
| 6,761,333 B2 | 7/2004 | Foster | |
| 6,764,048 B2 | 7/2004 | Jakubowski | |
| 6,796,530 B2 | 9/2004 | Jakubowski | |
| 6,811,123 B1 | 11/2004 | Foster | |
| 6,892,985 B2 | 5/2005 | Jakubowski | |
| 7,007,895 B2 | 3/2006 | Jakubowski | |
| 7,147,188 B2 | 12/2006 | Jakubowski | |
| 7,891,350 B2 | 2/2011 | Mckee | |
| 7,954,765 B2 | 6/2011 | Jakubowski | |
| 8,220,488 B2 | 7/2012 | McCully | |
| 8,490,652 B2 | 7/2013 | Bohaychuk et al. | |
| 8,708,283 B2 | 4/2014 | Tobias et al. | |
| 8,899,525 B2 | 12/2014 | Tobias et al. | |
| 9,021,932 B2 | 5/2015 | Tobias et al. | |
| 9,090,347 B2 | 7/2015 | Tobias et al. | |
| 9,376,209 B2 | 6/2016 | Tobias et al. | |
| 9,505,495 B2 | 11/2016 | Tobias et al. | |
| 2004/0016848 A1 | 1/2004 | Jakubowski, Jr. et al. | |
| 2005/0151020 A1 | 7/2005 | Marotta et al. | |
| 2007/0164163 A1 | 7/2007 | Jakubowski | |
| 2009/0100996 A1 | 4/2009 | Jakubowski et al. | |
| 2009/0250138 A1 | 10/2009 | Bavarian et al. | |
| 2011/0215173 A1 | 9/2011 | Hartnell | |

OTHER PUBLICATIONS

Aircraft Store Ejector System, U.S. Appl. No. 13/572,502, U.S. Pat. No. 8,899,525.
Pitch Control Valve in an Aircraft Store Ejector System, U.S. Appl. No. 13/572,504, U.S. Pat. No. 8,708,283.
Aircraft Store Ejector System, U.S. Appl. No. 13/572,560, U.S. Pat. No. 9,376,209.
Aircraft Store Ejector System, U.S. Appl. No. 15/194,273, U.S. Pat. No. 10,427,787.
Aircraft Store Ejector System, U.S. Appl. No. 13/572,506, U.S. Pat. No. 9,021,932.
Aircraft Store Ejector System, U.S. Appl. No. 13/572,579, U.S. Pat. No. 9,090,347.
Aircraft Store Ejector System, U.S. Appl. No. 14/088,070, U.S. Pat. No. 9,505,495.
Aircraft Store Ejector System, U.S. Appl. No. 15/362,639, U.S. Pat. No. 10,358,216.
Aircraft Store Ejector System, U.S. Appl. No. 16/436,085.

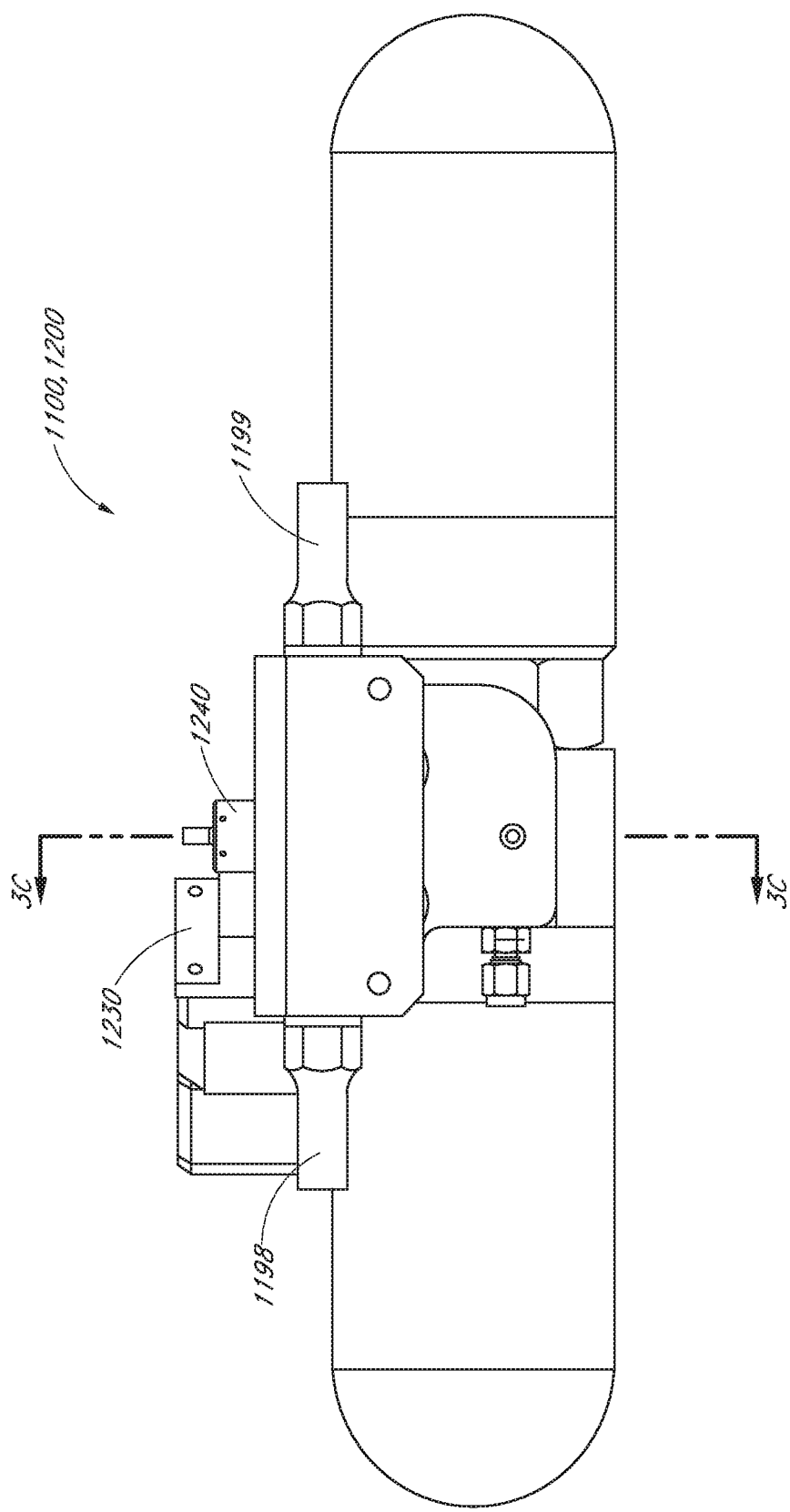

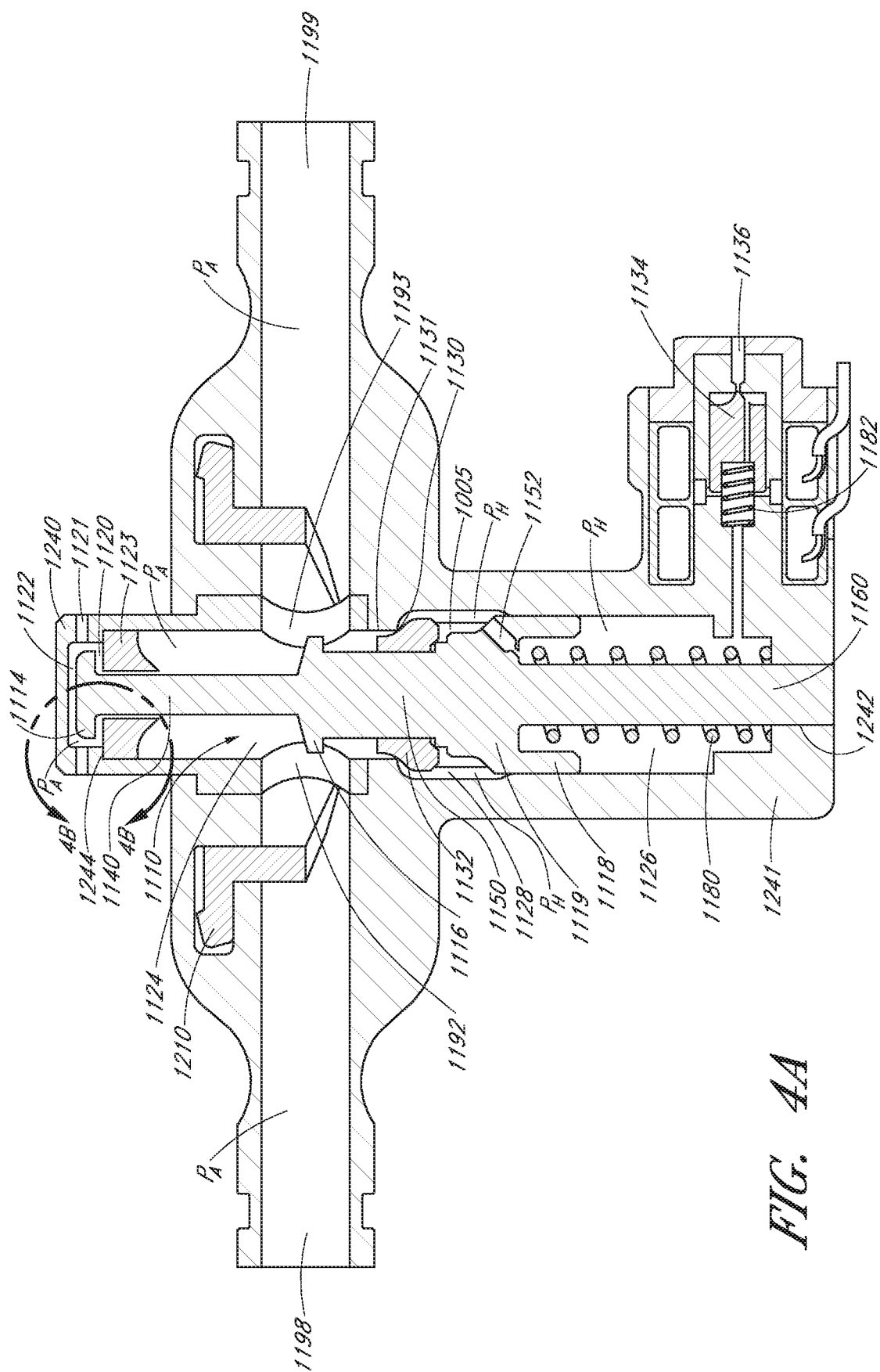

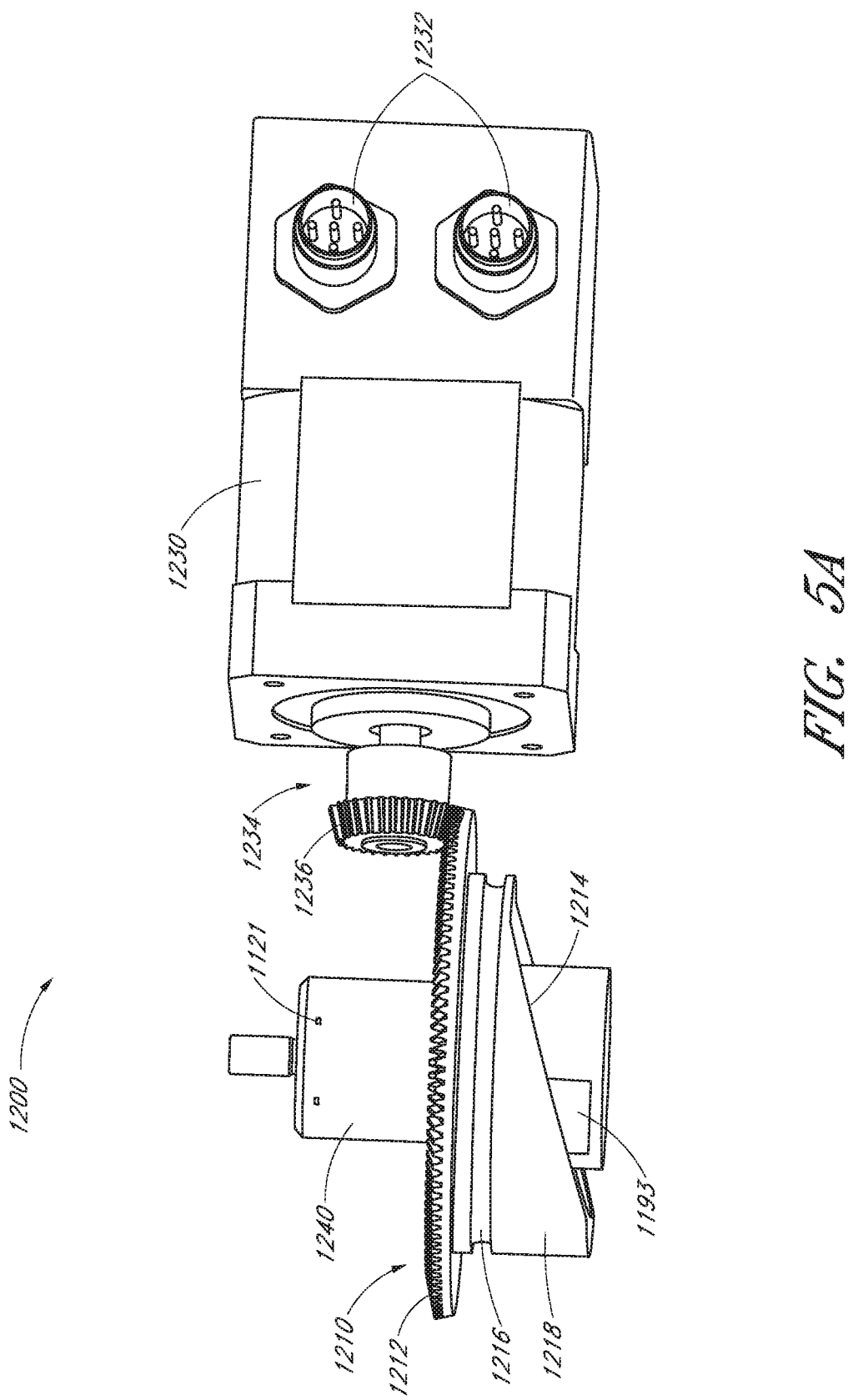

AIRCRAFT STORE EJECTOR SYSTEM

CROSS-REFERENCE TO RELATED APPLICATIONS

The present application is a continuation of U.S. patent application Ser. No. 15/194,273, titled AIRCRAFT STORE EJECTOR SYSTEM, filed Jun. 27, 2016, which is a continuation of U.S. patent application Ser. No. 13/572,560, titled AIRCRAFT STORE EJECTOR SYSTEM, filed Aug. 10, 2012, which claims priority under 35 U.S.C. § 119(e) to U.S. Provisional Patent Application Ser. No. 61/575,850, filed Aug. 30, 2011. The above-referenced applications are hereby incorporated by reference herein in their entirety. Additionally, the present application incorporates by reference the following applications, each of which was filed on Aug. 10, 2012 and is hereby incorporated by reference herein in its entirety: U.S. patent application Ser. No. 13/572,502, titled AIRCRAFT STORE EJECTOR SYSTEM, issued on Dec. 2, 2014 as U.S. Pat. No. 8,899,525; U.S. patent application Ser. No. 13/572,504, titled PITCH CONTROL VALVE IN AN AIRCRAFT STORE EJECTOR SYSTEM, issued on Apr. 29, 2014 as U.S. Pat. No. 8,708,283; U.S. patent application Ser. No. 13/572,506, titled AIRCRAFT STORE EJECTOR SYSTEM, issued on May 5, 2015 as U.S. Pat. No. 9,021,932; and U.S. patent application Ser. No. 13/572,579, titled AIRCRAFT STORE EJECTOR SYSTEM, issued on Jul. 28, 2015 as U.S. Pat. No. 9,090,347.

BACKGROUND

Technical Field

The disclosure relates generally to aircraft store ejectors. In particular, the disclosure relates to store ejector systems having onboard pressurized gas sources, a vented release valve, a pitch control valve, and/or a piston ejection system.

Description of the Related Art

Aircraft store ejector systems are commonly used in the aviation industry to allow for transport and/or release of stores carried by aircraft. A typical ejector system can include a plurality of hooks which hold the store to the aircraft wing or fuselage. The system will also often include one or more stabilizers, such as sway-braces, that can be configured to stabilize the store during flight. Many ejector systems also include hydraulic or gas-driven pistons that are used to aid gravity and push the store away from the aircraft upon release of the store from the hooks. Gas-driven pistons are sometimes actuated by "hot" gas generated by pyrotechnic devices. In some systems, gas driven pistons are actuated by "cold" gas, such as compressed air.

SUMMARY

An embodiment involves an aircraft store ejector system, including a pressurized gas arrangement having a remote reservoir and a local ejector reservoir. The remote reservoir has a larger volume than the ejector reservoir and is arranged to supply pressurized gas to the ejector reservoir. A pressure regulation arrangement is positioned between the remote reservoir and the ejector reservoir that adjusts a pressure level of the pressurized gas supplied from the remote reservoir to the ejector reservoir. A release valve arrangement includes a vent valve configured to provide selective fluid communication between the ambient surroundings of the release valve arrangement and one or more ejector passages. A main valve provides selective fluid communication between the ejector reservoir and the one or more ejector passages. A firing valve can be opened, which results in closing of the vent valve and then opening of the main valve. Wherein opening the main valve provides pressurized gas to the ejector passages. An ejection system receives a flow of pressurized gas from the ejector reservoir via the release valve arrangement. The ejection system includes a first ejector passage in fluid communication with the release valve arrangement and a first ejector piston. The ejection system also includes a second ejector passage in fluid communication with the release valve arrangement and a second ejector piston. The first ejector piston acts on a store at a first location and the second ejector piston acts on the store at a second location. At least one of first ejector piston and the second ejector piston includes a plurality of concentric telescopic piston stages. The space between each adjacent pair of the concentric piston stages defines a piston chamber. Each of the piston chambers contain a volume of gas that compresses as the plurality of telescopic piston stages move toward an extended configuration. The compressed volume of gas provides a return force on the plurality of piston stages to bias the plurality of telescopic piston stages toward a retracted position when the pressurized gas is evacuated from the ejection system via the vent valve. A pitch control valve controls the flow of pressurized gas to each of the first and second ejector passages. The pitch control valve includes a rotatable carousel that rotates about its axis. The carousel has an obstruction wall portion, which varies the flow area of the flow of pressurized gas when moving in a circumferential direction. The carousel is rotatable such that a selective portion of each gas flow passage leading to the first and second ejector cylinders can be variably obstructed by the obstruction wall portion to selectively proportion the pressurized gas flow between the first and second ejector cylinders.

In some arrangements, the pressure regulation arrangement comprises a pressure regulator and a pressure intensifier. The pressure intensifier can be a single stage compressor.

In some embodiments, the obstruction wall portion is defined by a circumferential wall of the carousel. The circumferential wall can have an end surface that defines a variable height of the obstruction wall portion with respect to angle of rotation.

In some cases, the carousel is driven by a motor whose rotational motion may be controlled by the aircraft on-board computer. The motor/carousel drive system can incorporate a sensor for sensing carousel angular position.

An embodiment involves an ejector system for an aircraft store, which includes a first ejector passage that supplies an ejector gas to a first ejector. The first ejector applies an ejection force to a first location on a store in response to the supply of ejector gas. A second ejector passage supplies an ejector gas to a second ejector, which applies an ejection force to a second location on the store in response to the supply of ejector gas. A pitch control valve regulates an amount of ejector gas provided to each of the first and second ejector passages. The pitch control valve includes a rotary carousel having an obstruction wall, which obstructs a portion of each of the first and second gas passages. The obstruction wall varies in height around its circumference such that an amount of obstruction of each of the first and second ejector passages can be adjusted by rotation of the carousel.

In some arrangements, at least a portion of an upper end of the wall resides in a plane that is oblique with respect to an axis of rotation of the carousel. In other arrangements, an entirety of an upper end of the wall resides in a plane that is oblique with respect to an axis of rotation of the carousel.

In some arrangements, the system further includes a motor configured to rotate the carousel about an axis of rotation. The carousel can also include a rotational input feature configured to enable rotational input to the carousel. The rotational input feature can be a set of annular gear teeth on the carousel. The motor can be an electric motor. The motor can include a rotatable portion, which has a rotational output feature configured to facilitate transmission of a rotational force from the motor to the rotation input feature.

In some embodiments, portions of the obstruction wall that obstruct the first and second ejector passages are diametrically opposed from one another.

An embodiment involves a pressurized gas system for an aircraft store ejector system, which includes a remote gas reservoir configured to hold a remote volume of a pressurized gas. An ejector gas reservoir holds an ejector volume of a pressurized gas. The remote volume is greater than the ejector volume and the remote gas reservoir is arranged to supply pressurized gas to the ejector gas reservoir. A pressure regulation arrangement is interposed between the remote gas reservoir and the ejector gas reservoir. The pressure regulation arrangement is configured to regulate a pressure of the pressurized gas supplied to the ejector gas reservoir to a desired pressure.

In some arrangements, the pressure regulation arrangement includes one or both of a pressure regulator and a pressure intensifier. The pressure intensifier can be a single-stage compressor.

In some arrangements, the system also includes a relief valve configured to selectively release pressurized gas from the ejector gas reservoir. The relief valve can be configured to direct released pressurized gas from the ejector reservoir to the pressure regulation arrangement. The relief valve can be configured to direct released pressurized gas from the ejector reservoir to a vent.

In some embodiments, the system further comprises one or more manual valves.

In some arrangements, one or more of the remote reservoir and the ejector reservoir are configured to be charged while the aircraft is on the ground.

In some embodiments, the remote reservoir includes a pressure control member and an actuating member. The actuating member is configured to actuate the pressure control member and the pressure control member is configured to modify the pressure of the gas within the remote reservoir. The pressure control member can be a plunger configured to reduce the volume of the remote reservoir when moved in a first direction and to increase the volume of the remote reservoir when moved in a second direction. The actuating member can be controlled by a person inside or outside the aircraft. The actuating member can be controlled by a sensor or other mechanism within or without the aircraft.

An embodiment involves a release valve arrangement for a pressurized gas reservoir of an aircraft store ejector system, the release valve including an upper piston housing portion having an interior space defining an upper valve chamber. The upper piston housing portion includes one or more vent ports and one or more ejector passage interfaces. The one or more vent ports are configured to create fluid communication between the ambient surroundings of the release valve arrangement and the upper valve chamber. The one or more ejector passage interfaces connect the upper valve chamber with one or more ejector passages. A lower piston housing portion is connected to the upper piston housing portion and has an interior space that defines a lower valve chamber. The lower piston housing portion includes a valve window and a valve seat. The valve window permits fluid communication between the pressurized gas reservoir and the lower valve chamber. A valve piston is movable within the upper piston housing portion and the lower piston housing portion. The valve piston has a first end, a second end, and an outer surface. The first end of the valve piston generally resides within the upper piston housing portion and the second end of the valve piston generally resides within the lower piston housing portion. The valve piston includes a cap portion connected to the first end of the valve piston and having an outer cross-sectional dimension greater than the outer cross-sectional dimension of the first end of the valve piston and one or more radial projections. The one or more radial projections are connected to the valve piston and extend outwardly from the outer surface of the valve piston. A vent poppet is housed in the upper valve chamber. The vent poppet is annular in shape. The vent poppet and an adjacent portion of the outer surface of the valve piston define a fluid flow passage therebetween. The cap portion can contact the vent poppet to cause movement of the vent poppet within the upper valve chamber. A main valve poppet is housed in the lower valve chamber. The main valve poppet is annular in shape and has an inner surface and an outer surface. The main valve poppet is configured to be movable relative to the valve piston. The outer surface of the main valve poppet is configured to engage the valve seat. The main valve poppet and the valve piston cooperate to create a seal between the upper valve chamber and the lower valve chamber when the main valve poppet is engaged with the valve seat. A firing valve is in fluid communication with the lower valve chamber and configured to vent the lower valve chamber when the firing valve is opened. When the firing valve is opened, pressurized gas from the valve window causes the valve piston to move downward toward the lower piston housing. The downward movement of the valve piston causes the cap portion to contact the vent poppet, and contact between the vent poppet and cap portion closes the one or more vent passages. Further downward movement of the valve piston brings the one or more radial projections into contact with the main valve poppet, and subsequent further downward movement of the valve piston disengages the main valve poppet from the valve seat allows for fluid communication between the pressurized gas reservoir and the interior of the upper piston housing.

In some arrangements, the valve piston also includes an expanded portion that contacts the main valve poppet to urge the main valve poppet into engagement with the valve seat. The expanded portion can be located between the one or more radial projections and the second end of the valve piston. The expanded portion can include a throttled port, which is configured to provide fluid communication between the valve window and the firing valve. The throttle port throttles the flow of fluid from the valve window to the firing valve.

In some arrangements, the valve piston is configured to release one or more store securing features from the aircraft store when the valve piston is moved toward the lower piston housing.

In some embodiments, the release valve arrangement further includes a resilient member configured to bias the valve piston toward the upper piston housing. The resilient member can be a compression spring.

In some arrangements, the cap portion, radial projections, and valve piston form a unitary part.

An embodiment involves an ejector piston assembly for an aircraft store ejection system. The ejector piston assembly is configured to move between a retracted position and an extended position. The ejector piston assembly includes an ejector piston housing having an interior chamber defining an axial centerline, a first end nearest the aircraft, and a second end furthest from the aircraft. The ejector piston housing further has a downward projection extending into the interior chamber of the housing from a first end of the housing. The downward projection has an axial centerline and an axial length. An outer piston stage has an interior chamber, a first end nearest the aircraft, and a second end furthest from the aircraft. The outer piston stage is coaxial with the ejector piston housing. The first end of the outer piston stage has an occluding portion. The piston assembly includes one or more intermediate piston stages, each of which has an interior chamber, a first end nearest the aircraft, and a second end furthest from the aircraft. The one or more intermediate piston stages are received within the interior chamber of and coaxial with the outer piston stage. An inner piston stage has an interior chamber, a first end nearest the aircraft, and a second end furthest from the aircraft. The inner piston stage includes a transverse wall configured to close the interior chamber of the inner piston stage at an intermediate location along the axial length of the inner piston stage. The inner piston stage is received within the interior chamber of and coaxial with an innermost one of the one or more intermediate piston stages. An outer piston chamber is defined between the ejector piston housing and the outer piston stage. An inner piston chamber is defined between the inner piston stage and the innermost one of the one or more intermediate piston stages. A volume of gas within the outer piston chamber and a volume of gas within the inner piston chamber are compressed as the ejection system transitions from the retracted position to the extended position. A ram member is connected to the second end of the inner piston stage and configured to contact the store. An inlet passage provides pressurized ejection gas from a pressurized gas source to the interior volume of the ejector piston housing. A passage is defined between the outer surface of the downward projection and the inner surface of the inner piston stage. The axial length of the downward projection is selected to create a space between the bottom surface of the downward projection and the transverse wall of the inner piston stage. The downward projection is at least partially positioned within the interior chamber of the inner piston stage when the ejection system is in the retracted position. The occluding portion of the outer piston stage restricts the rate of flow of pressurized gas from the inlet passage to the interior chamber of the ejector piston housing. At least a portion of the axial lengths of each of the piston stages extend past the second end of the ejector piston housing when the ejection system is in the extended position. The compressed volume of gas within each of the inner and outer piston chambers creates a force tending to bias the piston stages toward the first end of the housing when the ejection system is in the extended position.

In some arrangements, the ejection system is configured to transition to the retracted configuration upon opening of a vent valve in the pressurized gas release valve.

In some arrangements, at least one intermediate piston chamber is defined between the outer piston stage and an outermost one of the one or more intermediate piston stage. At least one resilient member is housed within the at least one intermediate piston chamber and is configured to create a force tending to bias the outermost one of the one or more intermediate piston stages toward the first end of the housing when the ejection system is in the extended position. The resilient member can be a compression spring.

In some embodiments, the outer piston stage includes an outer bleed passage configured to provide fluid communication between the outer piston chamber and one of the first ejector passage and the second ejector passage. In some embodiments, the inner piston stage further comprises an inner bleed passage configured to provide fluid communication between the inner piston chamber and one of the first ejector passage and the second ejector passage.

BRIEF DESCRIPTION OF THE DRAWINGS

The present aircraft store ejector system is described herein with reference to drawings of preferred embodiments, which are intended to illustrate and not to limit the present invention.

FIG. 3A illustrates a side view of portions of the aircraft store ejector system.

FIG. 4A illustrates a cross-sectional view of the release valve in a ready to fire position.

FIG. 5A illustrates a perspective view of an embodiment of a pitch control valve.

DETAILED DESCRIPTION

Figure 1:
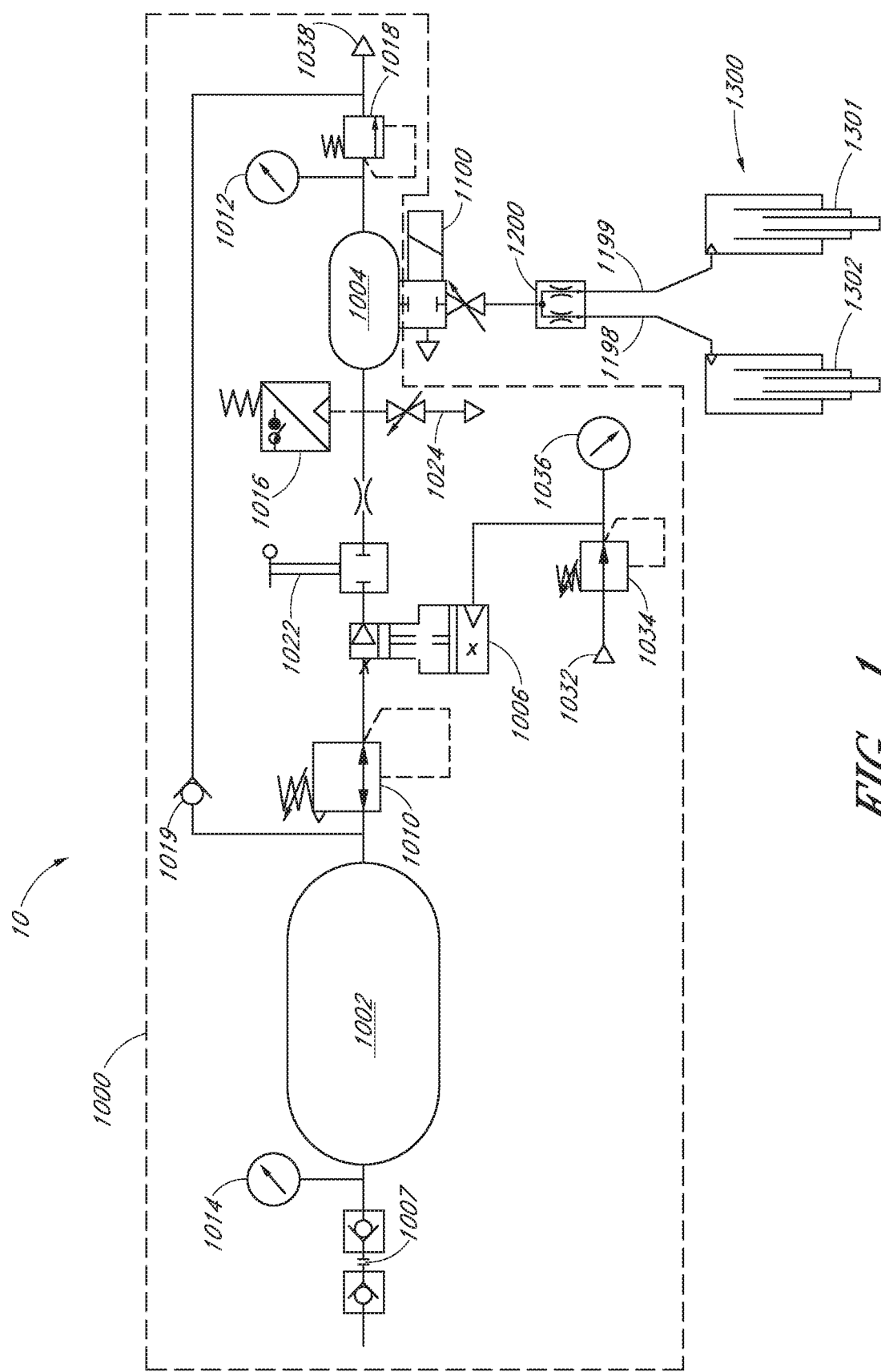
FIG. 1 illustrates a pneumatic circuit representation of an embodiment of the aircraft store ejector system.
Figure 2:
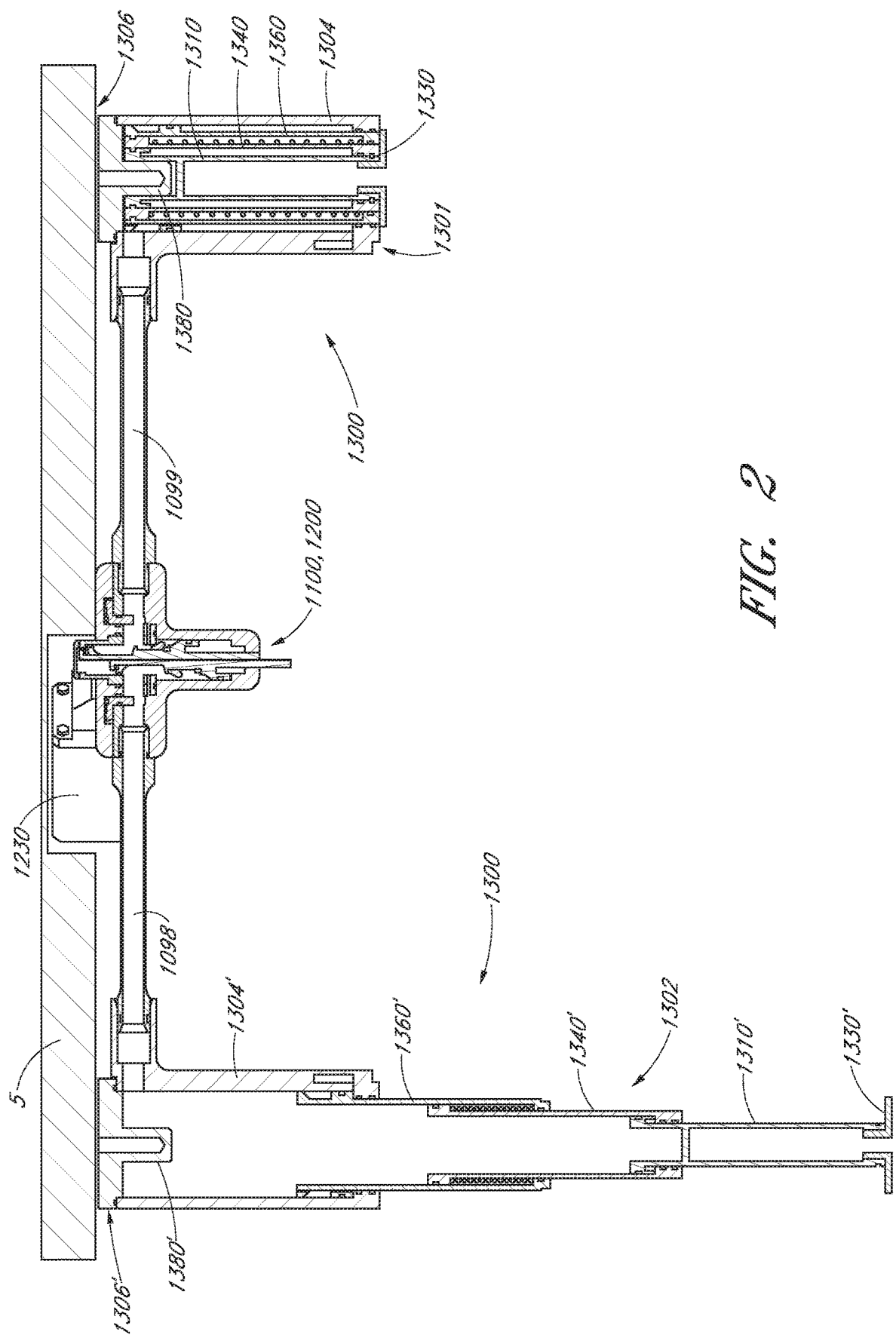
FIG. 2 illustrates a cross-sectional view of a release valve and first and second ejector pistons of an embodiment of the aircraft store ejector system.
Figure 3B:
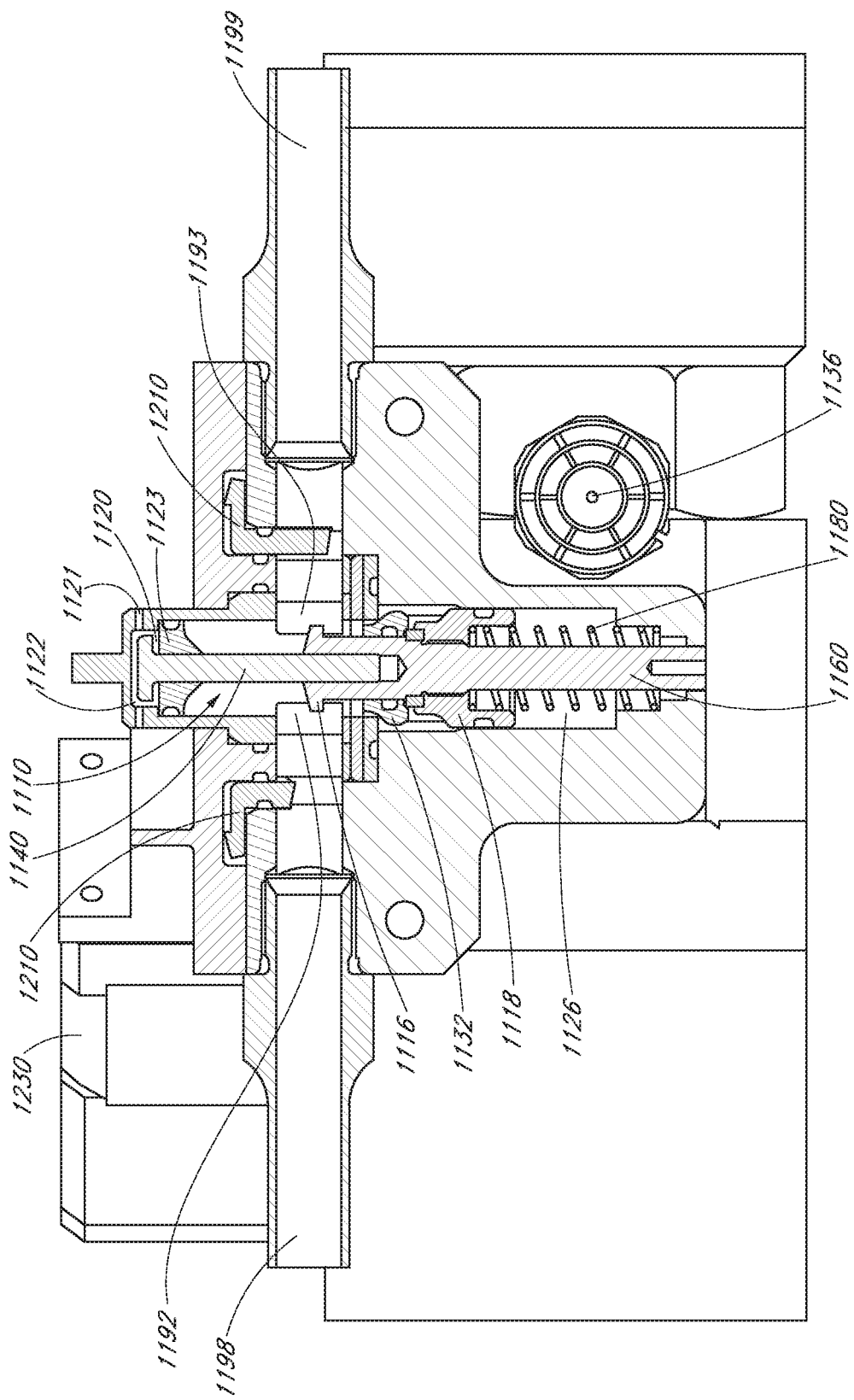
FIG. 3B illustrates a cross-sectional side view of the aircraft store ejector system of FIG. 3A.
Figure 3C:
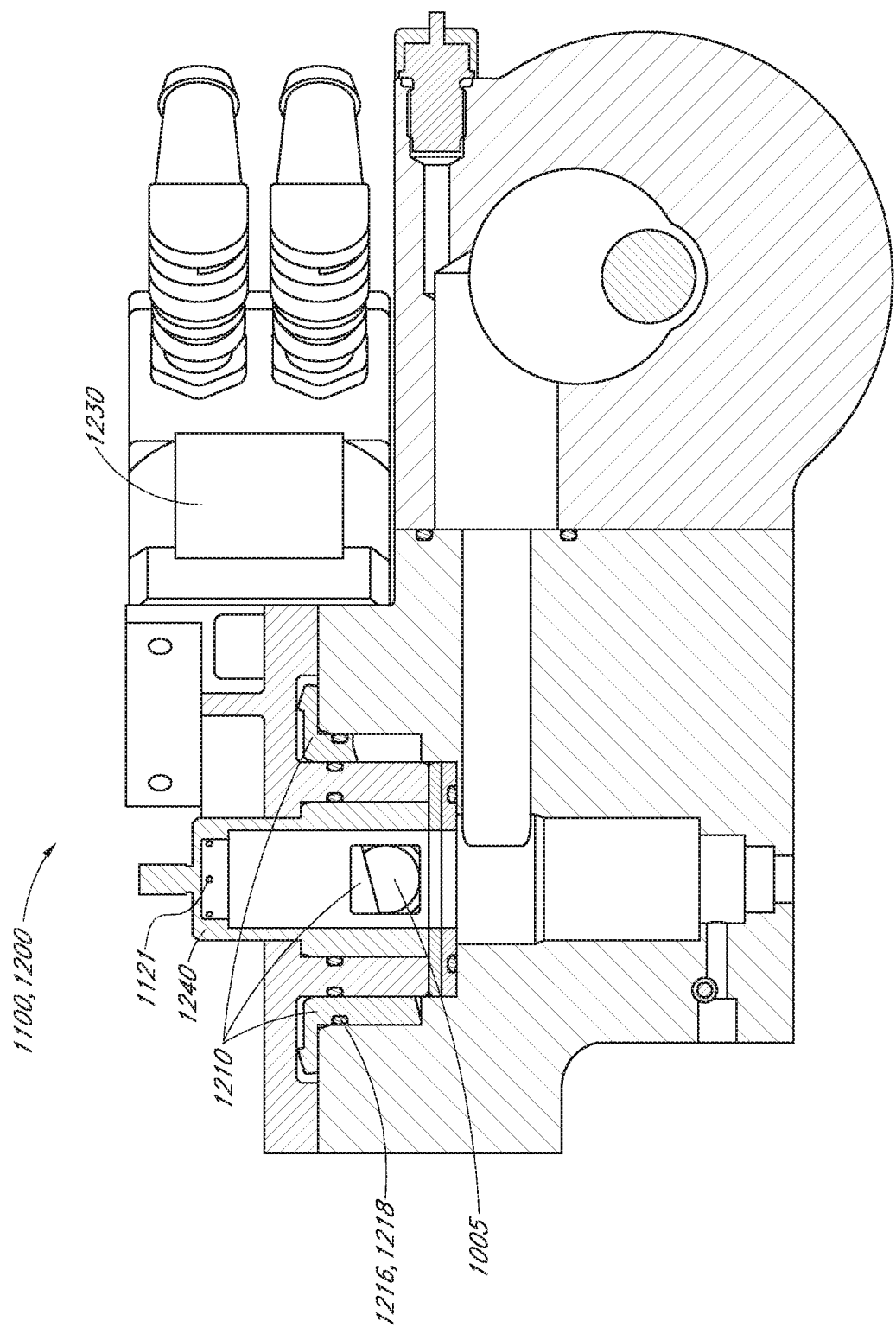
FIG. 3C illustrates a cross-sectional view of the aircraft store ejector system of FIG. 3A taken along the line 3C-3C of FIG. 3A.

Several embodiments of an improved aircraft store ejector system and individual components of the ejector system are disclosed herein. The embodiments disclosed are often are described in the context of an ejector system for use on the wing and/or fuselage of an aircraft.

For the purpose of providing context to the present disclosure, it is noted that there are essentially two types of cold gas energized ejection systems currently in service. Type A Systems are ground recharged bottle systems wherein an onboard pressure vessel local to the ejectors is charged while the aircraft is on the ground either while the vessel is installed or when the vessel has been removed such that it may be recharged remote from the air vehicle. Variations in ambient temperature or system leakage will cause the pressure within the on-board vessel to vary, leading to potentially unacceptable and/or unsafe changes in the overall ejection system performance.

Type B Systems are integral pressure intensifier systems wherein an onboard "multi-stage" pressure intensifier (which may be a compressor) is used to charge a bottle, which is local to the ejectors. The pressure intensifier charges the bottle from atmospheric pressure to operating pressure and then maintains optimal pressure across wide variations of system temperature etc.

Whereas such systems offer relative freedom from ground servicing, the ejection system's need for clean dry gas requires that pressure intensifier-based systems of this type incorporate special filters, either disposable or self-regenerating, whose efficacy and ultimate life are a function of atmospheric air quality. Further, pressure intensifier performance and life are adversely affected by increases in aircraft operational altitude—e.g., the pressure intensifier must work "harder" to reach optimal ejector pressure when altitude increases and local atmospheric pressure decreases. Also, the actual quality of the delivered air is unknown unless a means of purity monitoring is incorporated, adding further to the complexity of such systems.

Additionally, carriage and ejector release units for airborne stores generally use stored high pressure cold gas or pyrotechnic cartridge-generated hot gas to pressurize and effect the store separation sequence by first operating linkages to disengage the carriage hooks from the store suspension lugs and then aiding gravity by forcing vertically extending pistons to thrust the store away from the aircraft.

Generally, the maneuvering of the aircraft and the resulting airflow conditions at store release combine to generate forces on the departing store which, unless counteracted, would produce an unsafe and/or unstable separation of the store. Both are undesirable, in that the former presents an aircraft collision hazard and the latter could result in a loss of accuracy or range if the released store is a weapon.

A high total ejection force (and hence ejection velocity) provides one component of a solution for safe separation. However, airflow and maneuver forces generating excessive store pitch rotations need to be counteracted by opposing ejector forces acting differentially through the forward and rear ejector pistons. The term for this function is pitch control and it is generally achieved by adjusting the sizes of the orifices in the gas transfer paths leading to the two ejector positions such that the forward and aft forces can be varied in relation to one another. This adjustment typically takes place on the ground prior to the flight or mission using predictions of the actual flight and store separation conditions. Because the actual conditions may vary significantly from the predicted conditions, the pitch adjustment may often be less than optimal.

Upon release of the store from the aircraft, it is often required that the high pressure gas within the ejector system (e.g., within ejector pistons and corresponding fluid paths) be vented out of the system to allow retraction of the ejector pistons. Many current systems address this problem by placing vents at or near the extended ends of the pistons themselves. When the pistons are extended, the vents are exposed and vent the remaining high pressure gas to atmosphere. This method can be disadvantageous in that it requires the entire internal volume of the pistons to be filled before extension begins and, thus, a larger volume of pressurized gas must be vented prior to retraction. Furthermore, in such systems, the use of a plurality of spring or other retraction mechanisms is required to retract the ejector pistons. These retraction mechanisms can add weight to the piston assemblies. Extra weight in the piston assemblies not only adds overall weight to the aircraft, but also creates additional stress upon the airframe where the ejector assemblies are attached.

FIG. 1 illustrates an aircraft store ejector system 10 which can include a gas re-pressurization system 1000. The system 10 preferably is provided on an associated aircraft and is controlled by a suitable control system to release a store of any type. The control system can include any suitable sensors, processors, actuators or other typical or desirable components in addition to those illustrated herein, as will be appreciated by those skilled in the art. The control system can be a dedicated system or can be integrated with other control systems of the aircraft. The ejector system 10 can be controlled by a pilot or other crew member aboard the aircraft or can be controlled from a location remote from the aircraft.

The illustrated re-pressurization system 1000 includes a remote reservoir 1002 and a local reservoir 1004. In some embodiments, the re-pressurization system includes a pressure intensifier 1006 located between the remote reservoir 1002 and the local reservoir 1004. The ejector system 10 can further include a release valve 1100 configured to selectively introduce high pressure gas from the local reservoir 1004 to an ejection system 1300, in some cases through an optional pitch control valve 1200. The pitch control valve 1200 can be configured to distribute high pressure gas from the local reservoir 1004 to one or more ejector passages 1198, 1199. The pitch control valve 1200 can be configured to vary the distribution of high pressure gas between the one or more ejector passages 1198, 1199 (e.g., one ejector passage can receive more or less high pressure gas than another ejector passage). The ejector passages 1198, 1199 can be configured to allow high pressure gas to pass from the pitch control valve 1200 to the ejection system 1300. The ejection system 1300 can include one or more ejector pistons 1301, 1302. Preferably, the one or more ejector pistons 1301, 1302 are configured to extend upon introduction of high pressure gas into ejection system 1300. Although each of the gas re-pressurization system 1000, the release valve 1100, the pitch control valve 1200, and the ejection system 1300 are described herein in the context of their interrelationships, it should be noted that each of the systems/devices 1000, 1100, 1200, 1300 can be combined with systems and devices other than those described herein. For example, the re-pressurization system 1000 can be used with store release systems that do not include a pitch control valve 1200 or with store release systems that include pitch control valves other than the valve 1200 disclosed herein. Similarly, the re-pressurization system 1000 and/or pitch control valve 1200 can be used with ejection systems other than the ejection system 1300 disclosed herein.

In some embodiments, as explained above, the gas re-pressurization system 1000 includes a remote reservoir 1002. Preferably, the remote reservoir 1002 has a larger volume than the local reservoir 1004 (which is discussed below). In some such embodiments, the remote reservoir 1002 can hold more than twice the volume of the local reservoir 1003. In some arrangements, the remote reservoir 1002 can be configured to feed multiple local reservoirs 1004, each of which supply pressurized gas to at least one associated ejection system 1300. In such cases, the remote reservoir 1002 can be capable of holding a volume that is several multiples of a single local reservoir 1004. Such an arrangement can permit recharging of the local reservoirs 1004 to allow multiple store ejections. It is presently contemplated that, at least in some embodiments, the remote reservoir 1002 will be used primarily to "top-off" the pressure of one or more local reservoirs 1004, as opposed to completely refilling the local reservoirs 1004. Therefore, in some embodiments, the volume of the remote reservoir 1002 will be less than the combined volume of the local reservoirs 1004. As will be appreciated by those of skill in the art, a single aircraft may employ multiple ejector systems 10, including multiple remote reservoirs 1002 and multiple local reservoirs 1004. Such systems 10 can be controlled by a single control system or individual control systems and can be entirely independent or can share one or more components.

In some embodiments, the remote reservoir 1002 is configured to output high pressure cold gas to a pressure intensifier 1006. The pressure intensifier 1006 can be a compressor (e.g., a one-stage compressor), a pump, an air amplifier, any other suitable pressure-raising device, or any combination thereof. In some embodiments, it is desirable that a small, lightweight, single-stage pressure intensifier 1006 be used. Advantageously, the system 1000 arrangement permits "topping-off" of the local reservoir(s) 1004 using pressurized (i.e., above local atmospheric or ambient) gas from the remote reservoir 1002. Because of the reduced pressure differential between the supply gas and the local reservoir 1004, the pressure intensifier 1006 can be a light duty arrangement in comparison to systems utilizing ambient air as the supply gas. The re-pressurization system 1000 can include an intermediate pressure regulator 1010 which can regulate a pressure of the gas supplied to the local reservoir(s) 1004 from the remote reservoir 1002. In some embodiments, the intermediate pressure regulator 1010 is located between the remote reservoir 1002 and the pressure intensifier 1006. The regulator 1010, pressure intensifier 1006 or the combination can be referred to as a pressure regulation arrangement.

Referring to FIG. 1, the re-pressurization system 1000 can be connected to a remote pressure source 1032 to permit charging of the system 1000 or components thereof (e.g., the local reservoir(s) 1004) separately from the remote reservoir 1002. The remote pressure source 1032 could be a compressor, a pump, an air amplifier, or any combination thereof. The remote pressure source 1032 can be connected to the pressure intensifier 1006 such that the pressure can be increased, if necessary or desired, from a pressure of the remote pressure source 1032. In some embodiments, a remote pressure regulator 1034 can be located between the remote pressure source 1032 and the pressure intensifier 1006 to regulate or lower a pressure from a pressure of the remote pressure source 1032 if necessary or desired. A pressure indicator or gage 1036 can be provided to indicate system pressure at the location of the gage 1036.

In some embodiments, as explained above, the re-pressurization system 1000 includes a local reservoir 1004, and can include multiple local reservoirs 1004. The local reservoir 1004 can be configured to provide high pressure gas to the ejection system 1300 via the release valve 1100 and/or pitch control valve 1200. In some embodiments, the remote reservoir 1002 is configured to provide high pressure gas to the local reservoir 1004 while, before, and/or after the local reservoir 1004 provides high pressure gas to the ejection system 1300.

In some embodiments, the re-pressurization system 1000 includes a relief valve 1018. The relief valve 1018 can be used to compensate for overpressures in the local reservoir 1004. For example, the relief valve 1018 can be configured to release gas from the local bottle 1004 if the pressure within the local bottle 1004 reaches a pre-determined maximum pressure level. In some embodiments, the relief valve 1018 can direct the released gas through a non-return valve 1019 into ducting between the remote reservoir 1004 and the intermediate pressure regulator 1010. In some embodiments, the relief valve 1018 is configured to direct the released gas to a vent 1038. A pressure indicator or gage 1012 can be provided to indicate system pressure at the location of the gage 1012 (e.g., within the local reservoir 1004).

As illustrated, the re-pressurization system 1000 can include one or more additional valves and/or vents. For example, an isolating valve 1022 can be placed in the flow path between the remote reservoir 1002 and the local reservoir 1004. The isolating valve 1022 can be manually actuated, electromechanically actuated, or actuated by any other appropriate device or method. The isolating valve 1022 can, for example, connect the remote reservoir 1002 and the local reservoir for fluid communication or disconnect the remote reservoir 1002 and the local reservoir from fluid communication. Thus, preferably, the isolating valve 1022 is configured to allow for refilling of the remote reservoir 1002 with pressurized gas. In some embodiments, the isolating valve 1022 is located in the flow path between the pressure intensifier 1006 and the local reservoir 1004.

In some embodiments, the re-pressurization system 1000 includes a vent valve 1024. The vent valve 1024 can be located in the flow path between the remote reservoir 1002 and the local reservoir 1004 and can be actuated via manual input, electromechanical input, or any other appropriate device, method, or any combination thereof. The vent valve 1024 can be configured to, upon actuation, vent some or the entire pressure within the re-pressurization system 1000 or within some subsystem thereof. For example, the vent valve 1024 can be located between the isolating valve 1022 and the local reservoir 1004. In some such embodiments, the vent valve 1024 can be used to vent the local reservoir 1004, release valve 1100, pitch control valve 1200, and/or ejection system 1300 without venting the remote reservoir 1002. A pressure transducer 1016 can be provided to detect the system pressure (e.g., the pressure of the local reservoir 1004) for use by the system 10 or any other control system of the aircraft.

Both the remote reservoir 1002 and the local reservoir 1004 can be initially ground charged with high pressure purified gas (e.g., air, nitrogen, another suitable gas, or any combination thereof) from a source external to the aircraft. The remote reservoir 1002 can be filled with pressurized gas via a charge port 1007. A pressure indicator or gage 1014 can be provided to indicate system pressure at the location of the gage 1014. In some arrangements, the local reservoir(s) 1004 can be charged at the same time by opening the isolating valve 1022. The remote reservoir 1002 and/or local reservoir 1004 can be configured to be filled by a source within the aircraft (e.g., an onboard compressor or other pressurized gas source). In some embodiments, the remote reservoir 1002 and/or the local reservoir 1004 are separable from the re-pressurization system 1000. In such embodiments, the remote reservoir 1002 and/or the local reservoir 1004 can be charged while disconnected from the system 1000 and/or while removed from the aircraft.

In some embodiments, changes in altitude and/or temperature can lower the pressure within one or both of the remote reservoir 1002 and the local reservoir(s) 1004. In such situations, the local reservoir(s) 1004 can be recharged via the remote reservoir 1002. In some embodiments, the pressure intensifier 1006 can aid in the recharging of the local reservoir(s) 1004. In some arrangements, the volume of the remote reservoir 1002 is selected to allow multiple (e.g., about 5-15) ejection cycles for the local reservoir 1004 before recharging is necessary.

Furthermore, ground charging of the remote reservoir 1002 and the local reservoir 1004 can eliminate the need for onboard filtration or gas purity monitoring equipment. Furthermore, because the gas pressure in the remote reservoir 1002 is above atmospheric pressure, a light-duty (e.g., a single stage) pressure intensifier 1006 can be used. Reducing the mechanical complexity of the pressure intensifier 1006 can improve the durability of such a device when compared to a multi-stage pressure intensifier (e.g., a multi-stage compressor) fed by atmospheric pressure.

As explained above, a release valve 1100 can be used to selectively release high pressure gas from the local reservoir 1004 to the ejection system 1300. The release valve 1100 can be of any suitable type or construction. As illustrated in FIGS. 4A-4E, the illustrated release valve 1100 includes a housing body that can include an upper piston housing 1240, a lower piston housing 1241, a valve body or valve piston 1110, a vent valve 1120, a main valve 1130, and/or a firing valve 1136. In some embodiments, the valve piston 1110 can be a servo piston. As illustrated, the valve piston 1110 can include one or more axial and/or radial sections having cross-sectional shapes configured to accomplish one or more specific functions. For example, the valve piston 1110 can include a top portion 1140 having a generally cylindrical shape, an axial centerline, an axial length, and an outer surface. The outer surface of the top portion 1140 can be constant along the axial length of the first portion. In some embodiments, the top portion 1140 can include flared, stepped, and/or tapered sections along its axial length to block or allow flow, as necessary or desired. In some embodiments, the valve piston 1110 includes a cap portion 1114 connected to the top (e.g., toward the top of FIG. 4A) of the top portion 1140. The cap portion 1114 can have a generally cylindrical shape, an axial centerline, an outer surface, and an axial length. In some embodiments, the cap portion 1114 is coaxial with the top portion 1140. In some such embodiments, a cross-sectional dimension of the outer surface of the cap portion 1114 is greater than a cross-sectional dimension of the outer surface of the top portion 1140.

The valve piston 1110 can include an intermediate portion 1150. The intermediate portion 1150 can have a generally cylindrical shape, an axial centerline, an axial length, and an outer surface. In some embodiments, the intermediate portion 1150 is connected to and/or coaxial with the top portion 1140. In some embodiments, the intermediate portion 1150 can have flared, stepped, and/or tapered sections along its axial length to block or allow flow, as necessary or desired. For example, the intermediate portion 1150 can include an expanded portion 1119. The cross-sectional dimension of the outer surface of the expanded portion 1119 can be larger than the cross-sectional dimension of the outer surface of the intermediate portion 1150 and, in some embodiments, the expanded portion 1119 can have an outer surface that substantially or entirely fills an interior portion of the lower piston housing 1241 in the vicinity of the expanded portion 1119.

In some embodiments, the valve piston 1110 includes a bottom portion 1160. The bottom portion 1160 can extend from the intermediate portion 1150 in a direction opposite the top portion 1140. The bottom portion 1160 can have a generally cylindrical shape, and axial centerline, an axial length, and an outer surface. In some embodiments, the bottom portion 1160 can extend through a port 1242 in the lower piston housing 1241. Although the portions of the valve piston 1110 have been described as having generally cylindrical shapes, it is anticipated that other suitable shapes may be utilized for one or more of the portions of the valve piston 1110. For example, one or more portions of the valve piston 1110 could have generally oval-shaped outer cross-sectional shapes, rectangular outer cross-sectional shapes, or any other suitably-shaped outer cross-sections. Furthermore, unless indicated otherwise, the terms "cylinder" or "cylindrical" are used herein in accordance with their ordinary meaning, which have a broad definition and encompass a closed loop of any cross-sectional shape that is extruded along an axis to define a length. A cylinder can be solid or hollow in cross-section.

In some embodiments, the vent valve 1120 can be formed through the use of a floating poppet 1123. The floating poppet 1123 can have an inner surface, an outer surface, a central axis, and an axial length. The outer surface of the floating poppet 1123 can be configured fit snuggly within an inner surface of the upper piston housing 1240. In some embodiments, the floating poppet 1123 can be configured to slidably engage with the inner wall of an intermediate section 1124 (described below) of the upper piston housing 1240. Preferably, a cross-sectional dimension of the inner surface of the floating poppet 1123 is larger than a cross-sectional dimension of the outer surface of the top portion 1140 of the valve piston 1110 so that a passage is defined therebetween to permit fluid flow. In some such embodiments, the floating poppet 1123 is coaxial with the top portion 1140 of the valve piston 1110 and is positioned between the cap portion 1114 and intermediate portion 1150 of the valve piston 1110. The cap portion 1114 can be configured to have an outer cross-sectional dimension that is larger than the inner cross-sectional dimension of the floating poppet 1123 so that the floating poppet 1123 can be moved in one direction (e.g., downward in FIGS. 4A-4E) by the valve piston 1110. In some embodiments, the floating poppet 1123 can be normally biased in the upward direction (e.g., toward the top of FIGS. 4A-4E) by any suitable arrangement, such as system pressure or a biasing member (e.g., a spring). Preferably, upward movement of the floating poppet 1123 is limited by a protrusion 1244, such as a shoulder or other stop surface, near the top of the upper piston housing 1240.

Figure 4B:
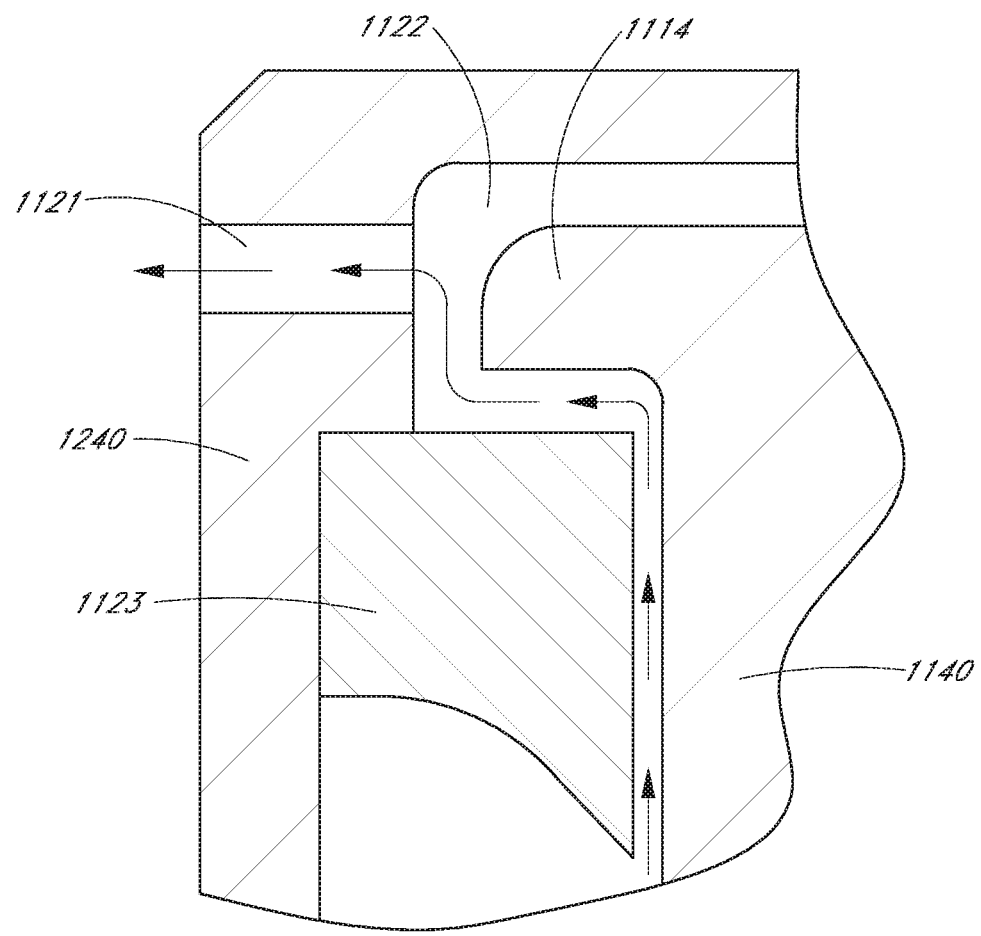
FIG. 4B illustrates an enlarged view of a portion of the release valve indicated by the line 4B-4B in FIG. 4A.

The vent valve 1120 can be configured to transition to an open configuration when there is clearance between the upper surface of the floating poppet 1123 and the lower surface of the cap portion 1114. In such configurations, gas and/or other fluids can pass through the passage between the inner surface of the floating poppet 1123 and the outer surface of the top portion 1140 of the valve piston 1110 and through the space between the upper surface of the floating poppet and the lower surface of the cap portion 1114, as illustrated in FIG. 4B. The upper piston housing 1240 can include one or more vent ports 1121 that can allow gas to vent out from the interior of the upper piston housing 1240 when the vent valve 1120 is in the opened configuration. Advantageously, such an arrangement provides a simple means for venting the system pressure in a non-firing position or mode.

As illustrated, the main valve 1130 can be formed through the use of a valve body or main valve poppet 1132. The main valve poppet 1132 can have a generally annular shape, an axial centerline, an inner surface, and an outer surface. In some embodiments, the outer surface of the main valve poppet 1132 includes one or more tapered, flared, and/or stepped portions. The main valve poppet 1132 can be configured such that the inner surface of the main valve poppet 1132 is sized to fit snugly around at least a portion of the intermediate portion 1150 of the valve piston 1110. As illustrated in FIG. 4A, the main valve poppet 1132 can be tapered such that a cross-sectional dimension of the outer surface of the main valve poppet 1132 is smaller at the top of the main valve poppet 1132 than at the bottom of the main valve poppet 1132. In some such configurations, the lower piston housing 1241 can have a reduced inner portion that defines a valve seat 1131 generally near the top of the lower piston housing 1241. The valve seat 1131 of the lower piston housing 1241 can be configured to be greater than the upper outer cross-sectional dimension of the main valve poppet 1132 and smaller than the lower outer cross-sectional dimension of the main valve poppet 1132. In some such configurations, the main valve poppet 1132 can form a substantially fluid-tight seal with the valve seat 1131 of the lower piston housing 1241. The fluid-tight seal can be released when the main valve poppet 1132 is moved downward and away from the reduced cross-section area 1131 of the lower piston housing 1241. Release of the fluid-tight seal results in an opening of the main valve 1130, thereby permitting fluid communication between sections of the release valve 1100 above the main valve 1130 and sections of the release valve 1100 below the main valve 1130.

In some embodiments, the space within the release valve 1100 can be characterized into one or more sections. A vent section 1122 is defined by the space within the release valve 1100 above (e.g., toward the top of FIGS. 4A-4E) the vent valve 1120. An intermediate section 1124 is defined as the space between the main valve 1130 and the vent valve 1120. The intermediate section 1124 can be in continuous fluid communication with the ejector passages 1198, 1199 throughout the stroke of the valve piston 1110 via one or more ejector passage interfaces 1192, 1193. A main valve section 1128 is defined as the space between the main valve 1130 and the expanded portion 1119 of the valve piston 1110. In some embodiments, the main valve section 1128 is in communication with the local reservoir 1004. In some such embodiments, the main valve section 1128 can be maintained at the same or a similar pressure as the local reservoir 1004 via a valve window 1005. The space between the expanded portion 1119 and the firing valve 1136 is defined as the firing section or space 1126. In some embodiments, a resilient member 1180 can be housed within the firing space 1126. The resilient member 1180 can be a compression spring or other resilient object configured to apply an upward force on the lower side of the expanded portion 1119.

According to some embodiments, the release valve 1100 can begin an ejection cycle in a ready to fire configuration, as illustrated in FIG. 4A. In such a configuration, the firing valve 1136 is in a closed position. In some embodiments, the firing valve 1136 is closed by a valve body or plug 1134. Furthermore, the intermediate section 1124 is isolated from the main valve section 1128 by the main valve 1130 and/or the main valve poppet 1132 when the release valve 1100 is in the ready to fire configuration. In some embodiments, the main valve section 1128 is in fluid communication with the firing space 1126 via a throttled port 1152. The throttled port 1152 can be positioned within the expanded portion 1119 of the valve piston 1110. Fluid communication between the firing space 1126 and the main valve section 1128 can allow for a buildup of high pressure ("$P_H$" as noted in the figures) gas within the firing space 1126 when the local reservoir 1004 is charged with high pressure gas. The throttled port 1152 preferably regulates (e.g., increases) the amount of time required for the equalization of pressure between the main valve section 1128 and the firing section 1126 such that unequal pressures can be implemented to cause or assist movement of the valve piston 1110.

When the vent valve 1120 is in the open configuration, as illustrated in FIG. 4A, the ejector passages 1198, 1199, the intermediate section 1124 of the release valve 1100, and the upper portion of the release valve 1100 are in communication with ambient via the vent ports 1121. This keeps the ejector passages 1198, 1199, the intermediate section 1124 of the release valve 1100, and the upper portion of the release valve 1100 at ambient pressure ("PA" as noted in the figures) while the vent valve 1120 is in the open configuration. Any intentional or incidental leakage of high pressure gas from the main valve section 1128 through the main valve 1130 into the intermediate space 1124 can be vented to atmosphere when the vent valve 1120 is in the open configuration, thereby preventing inadvertent pressurization of the ejector passages 1198, 1199 and/or ejection system 1300.

In some embodiments, pressurization of the firing space 1126 with high pressure gas can help maintain the release valve 1100 in the ready to fire configuration. For example, in some embodiments, the cross-sectional dimension of the outer surface of the bottom portion 1160 of the valve piston 1110 is smaller than the cross-sectional dimension of the outer surface of the intermediate portion 1150. In such an embodiment, the projection of the upper surface of the expanded portion 1119 onto a plane perpendicular to the axial centerline of the expanded portion 1119 is smaller than the projection of the lower surface of the expanded portion 1119 onto the same plane. As a result, in situations where the pressure above and below the expanded portion 1119 is equal, a greater axial pressure force would be exerted upon the lower side of the expanded portion 1119 than on the upper side of the expanded portion 1119 due to the increased area upon which the axial pressure force would be acting. Such an imbalance of force would result in upward movement of the expanded portion 1119 and, in embodiments where the expanded portion 1119 is fixedly attached to the valve piston 1110, the valve piston 1110. In some embodiments, the imbalance of force described above is augmented by spring force provided to the underside of the expanded portion 1119 by the resilient member 1180.

In some embodiments, upward movement of the expanded portion 1119 and/or the valve piston 1110 can be limited by contact between the expanded portion 1119 and the main valve poppet 1132 when the main valve 1130 is in the closed configuration. In some embodiments, upward movement of the valve piston 1110 could be additionally or alternatively limited by contact between the upper surface of the cap portion 1114 and the lower surface of the top of the upper piston housing 1240. In some embodiments, upward movement of the valve piston 1110 can be limited by contact between the expanded portion 1119 and the main valve poppet 1132 such that the cap portion 1114 is inhibited from contacting the lower surface of the top of the upper piston housing 1240, as illustrated in FIG. 4A.

Figure 4C:
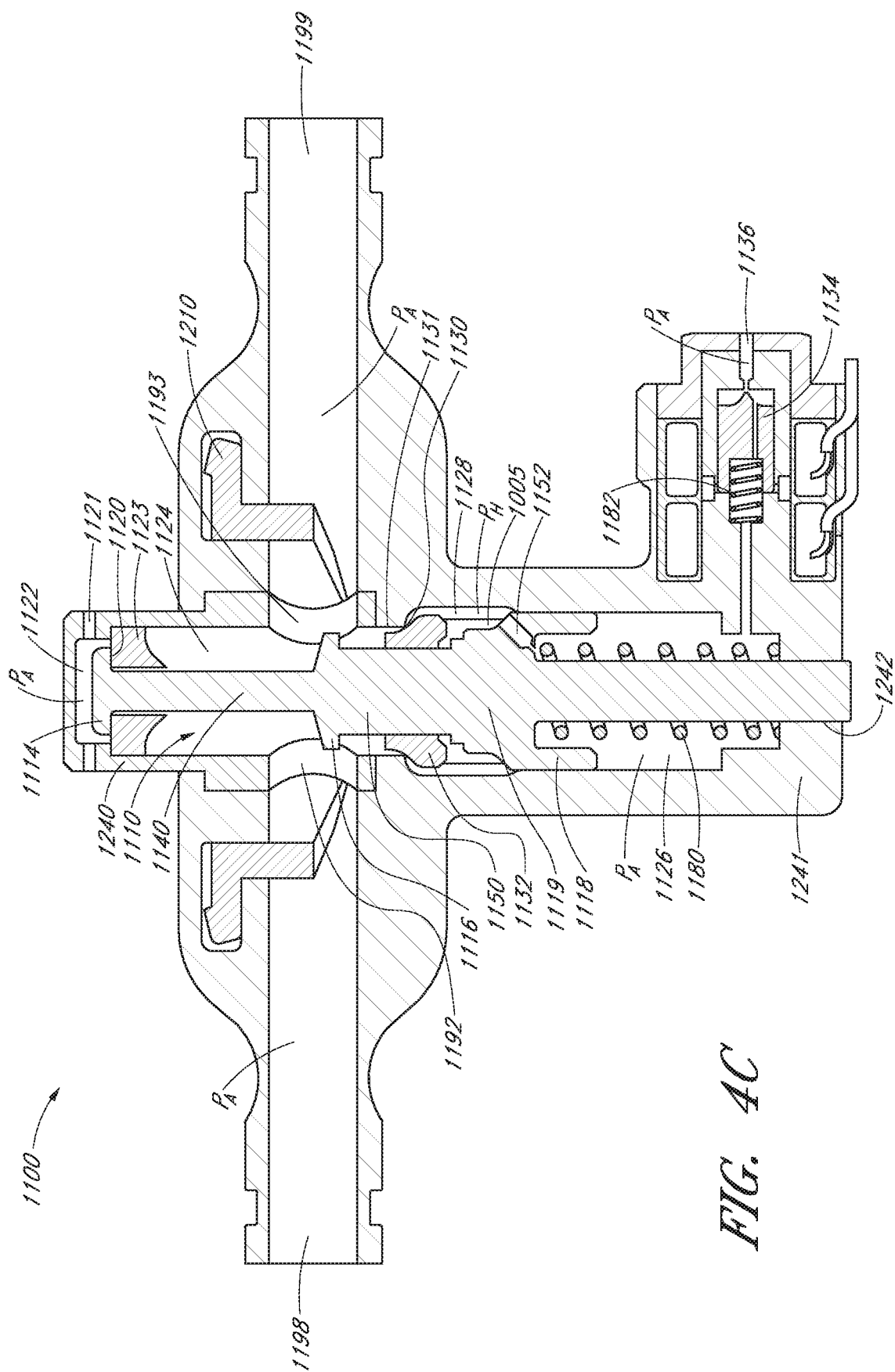
FIG. 4C illustrates a cross-sectional view of the release valve of FIG. 4A in a first position.

Referring to FIG. 4C, the ejection cycle can be initiated by actuating or moving the plug 1134 to open the firing valve 1136. The plug 1134 can be actuated by any suitable arrangement. For example, the firing valve 1136 can be a solenoid or solenoid-type valve. Upon opening of the firing valve 1136, the high pressure gas within the firing space 1126 can evacuate through the firing valve 1136. Preferably, the firing valve 1136 is configured to allow gas to escape to ambient at a rate higher than the rate at which the throttled port 1152 allows gas to travel from the main valve section 1128 to the firing space 1126. Accordingly, the pressure within the firing space 1126 is lowered to at or near ambient pressure (or to a relative pressure low enough to cause or permit movement of the valve piston 1110). Because the main valve section 1128 is maintained at or near (e.g., just below) the pressure of the local reservoir 1004, an imbalance of the axial forces on the top and bottom of the expanded portion 1119 is created. Because the pressure within the local reservoir 1004 is higher than the pressure within the firing space 1126, the axial forces on the expanded portion 1119 will cause the valve piston 1110 to move downward. That is, when the pressure in the local reservoir 1004 is high enough to create a downward force upon the expanded portion 1119 greater than upward force created by the ambient (or other) pressure and spring force beneath the expanded portion 1119, the valve piston 1110 will move downward. Downward motion of the valve piston 1110 causes the cap portion 1114 to contact the floating poppet 1123. Contact between the cap portion 1114 and the floating poppet 1123 closes the vent valve 1120, as illustrated in FIG. 4C.

Figure 4D:
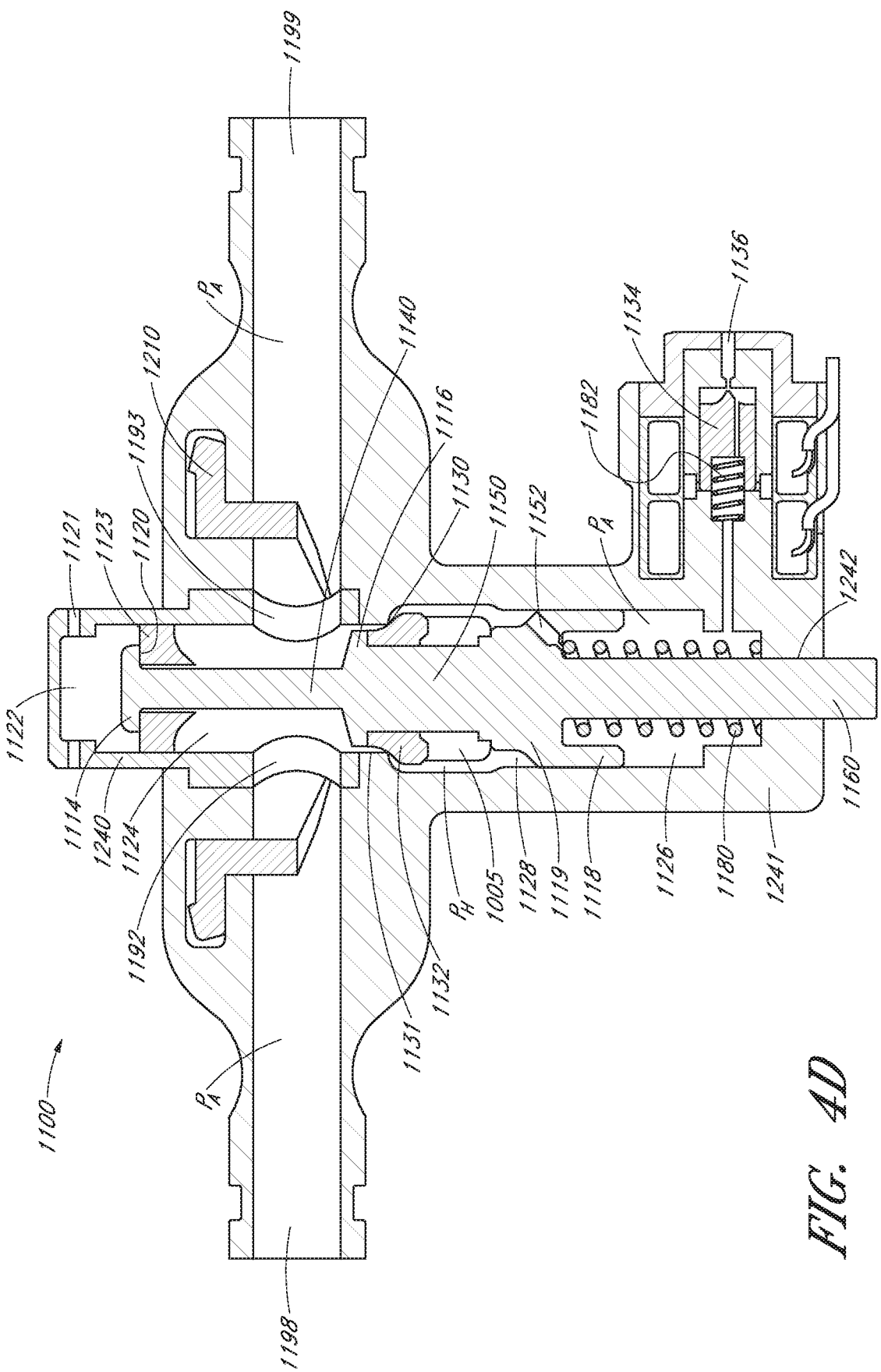
FIG. 4D illustrates a cross-sectional view of the release valve of FIG. 4A in a second position.

Further movement of the valve piston 1110 in the downward direction can cause a portion (e.g., the bottom portion 1160) of the valve piston 1110 to actuate a mechanism which releases store securing features holding the store to the aircraft. The store securing features can include sway braces configured to stabilize the store. In some embodiments, the store securing features are hooks holding the store to the aircraft. In some embodiments, the valve piston 1110 includes a feature that engages the main valve poppet 1132. In the illustrated arrangement, the feature is a shoulder 1116. In some embodiments, the shoulder 1116 is annular and can be broken into a plurality of radial projections from the valve piston 1110. The shoulder 1116 can be positioned at the border between the top portion 1140 and intermediate portion 1150 of the valve piston 1110. Downward movement of the valve piston 1110 can bring the shoulder 1116 into contact with the main valve poppet 1132, as illustrated in FIG. 4D. Thus, the valve piston 1110 and main valve poppet 1132 create a lost motion mechanism. The distance between the shoulder 1116 and the main valve poppet 1132 provides a delay in actuation of the main valve poppet 1132 and, as described below, the release of pressurized gas to the ejection system 1300 to ensure that the store securing features have been released.

Figure 4E:
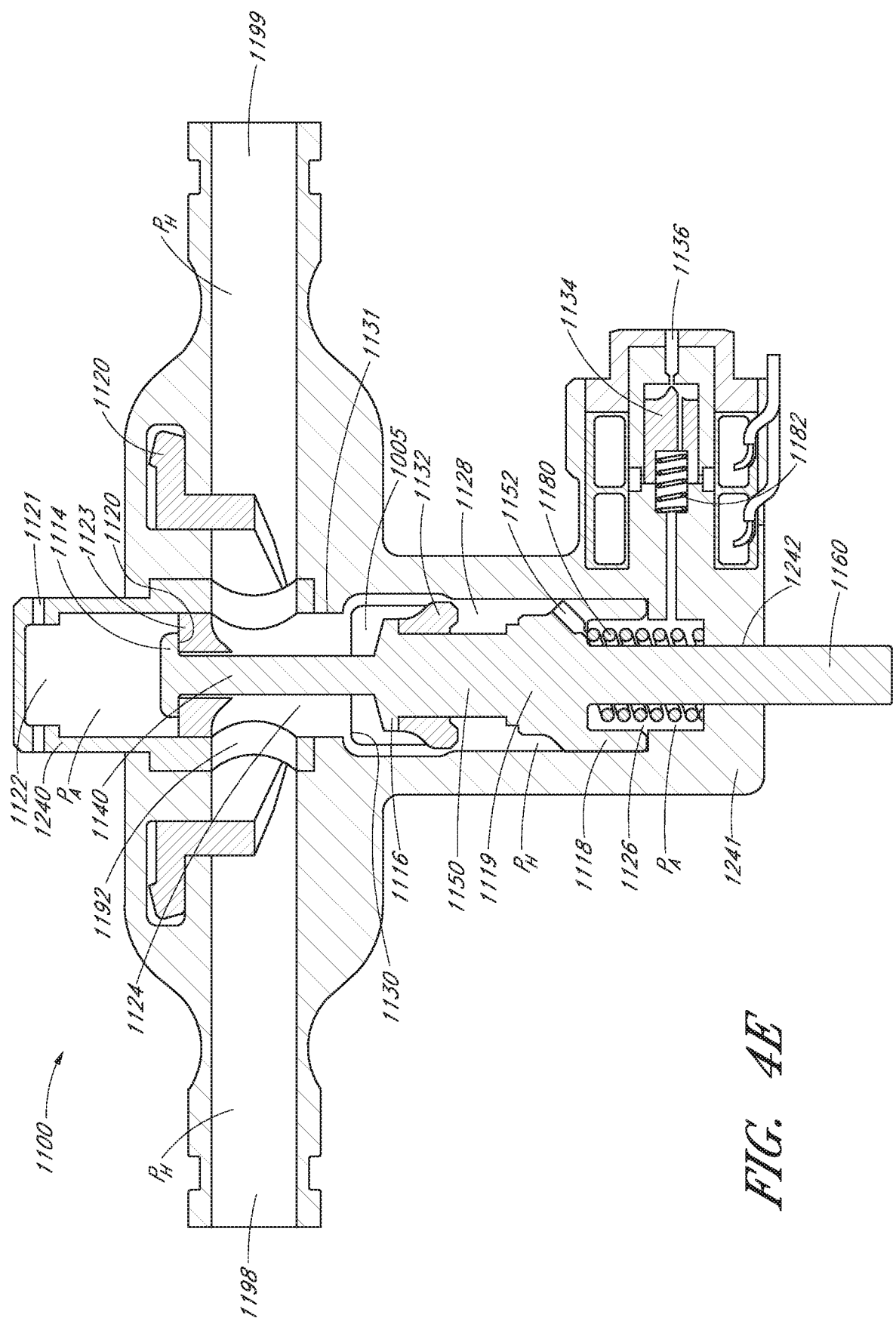
FIG. 4E illustrates a cross-sectional view of the release valve of FIG. 4A in a third position.

Referring to FIG. 4E, further movement of the valve piston 1110 in the downward direction can cause the main valve poppet 1132 to move away from the valve seat 1131 of the lower piston housing 1241. The downward movement of the valve piston 1110 can be limited by a stop surface, which can be defined by the end of an axial extension 1118 from the bottom of the expanded portion 1119. For example, the axial extension 1118 can be configured to come into contact with a shoulder or other surface feature of the lower cap housing 1241 when the valve piston 1110 has moved in an opening direction (e.g., downward in FIGS. 4A-4E) a pre-determined distance, as illustrated in FIG. 4E. Disengagement of the main valve poppet 1132 from the reduced cross-section area 1131 opens the main valve 1130 and creates fluid communication between the valve window 1005 and the intermediate section 1124. Such fluid communication allows high pressure gas from the local reservoir 1004 to enter the ejector passages 1198, 1199. Entry of high pressure gas into the ejector passages 1198, 1199 can actuate the ejection system 1300. Actuation of the ejection system 1300 can cause the ejector pistons 1301, 1302 to extend and eject the store from the aircraft.

Upon closure of the firing valve 1136, the pressure of the gas in the firing space 1126 is raised via migration of high pressure gas from the main valve section 1128 to the firing space 1126 through the throttled port 1152. As the pressure in the firing space 1126 is raised, the axial pressure force upon the underside of the expanded portion 1119 is raised. The valve piston 1110 can be configured to move upward when the axial force on the bottom of the expanded portion 1119 caused by the resilient member 1180 and the axial pressure overcomes the axial pressure force exerted downward upon the top of the expanded portion 1119. Additionally, the high pressure within the intermediate section 1124 can create an upward axial force upon the bottom of the floating poppet 1123. The upward force upon the bottom of the floating poppet 1123 can provide an additional force tending to cause the valve piston 1110 to move in the upward direction. In some embodiments, the valve piston 1110 is configured to move in the upward direction until the expanded portion 1119 comes into contact with the main valve poppet 1132 and the main valve poppet 1132 comes into contact with the reduced inner cross-section area 1131. Such movement can result in disengagement of the cap portion 1114 from the floating poppet 1123, opening the vent valve 1120. As explained above, opening of the vent valve 1120 can vent the ejector passages 1198, 1199 and the ejection system 1300. Venting of the ejection system 1300 can cause the ejector pistons 1301, 1302 to return to a retracted configuration, as described below.

In some embodiments, as discussed above, the aircraft store ejector system 10 can include a pitch control valve 1200 that apportions the flow of pressurized gas between multiple flow passages, such as the ejector passages 1198, 1199. Referring to FIG. 5A, the pitch control valve 1200 can include a rotational valve body, such as a carousel 1210. The carousel 1210 can include an annular occluding portion 1218. In some embodiments, the occluding portion 1218 is an annular obstruction wall, preferably which is variable in height along at least a portion of or its entire periphery or circumference. In some embodiments, an end surface (e.g., the bottom surface 1214) of the occluding portion 1218 can have a ramped configuration, such that a maximum height of the occluding portion 1218 is located approximately 180° from the minimum height of the occluding portion 1218. As illustrated in FIGS. 4A-4E, a portion of the carousel 1210 can be positioned between the valve window 1005 and the ejector passages 1198, 1199. Preferably, the occluding portion 1218 of the carousel 1210 obstructs the flow of high pressure gas from the valve window 1005 to the ejector passages 1198, 1199 when the main valve 1130 is opened. When oriented as shown in FIG. 4A, the occluding portion 1218 is obstructing ejector passage 1198 to the same extent that it is occluding ejector passage 1199. The carousel can include a groove 1216 (FIG. 5A) configured to receive a seal member (not shown) to create a substantial seal with the housing that supports the carousel 1210.

Figure 5B:
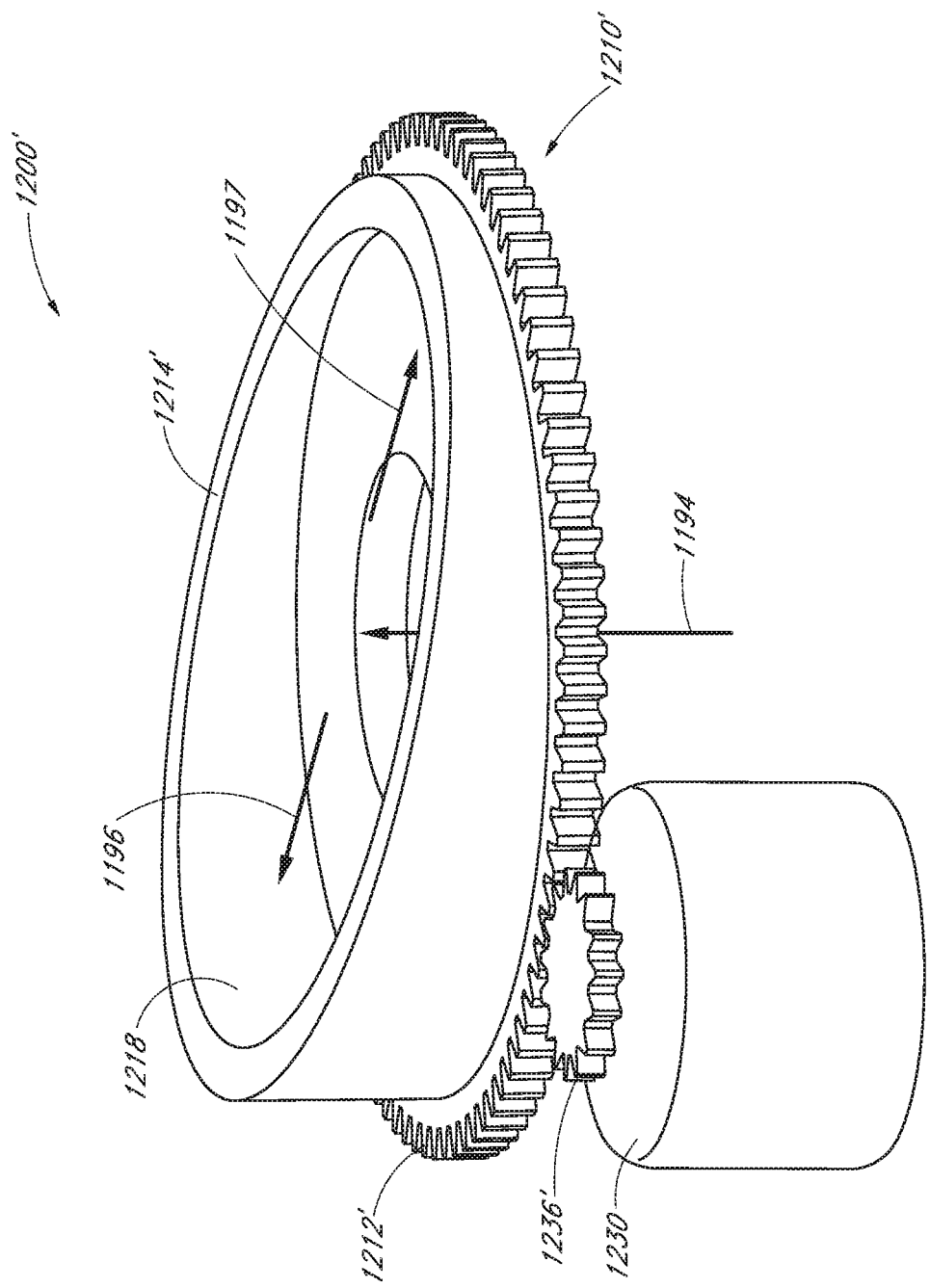
FIG. 5B illustrates a perspective view of a portion of an embodiment of a pitch control valve, which is a modification of the embodiment illustrated in FIG. 5A.

In some embodiments, the carousel 1210' can be oriented such that an end surface of the occluding member 1218' that defines the variable height is the upper surface, as illustrated in FIG. 5B. In such embodiments, the release valve flow 1194 can enter the carousel 1210' from beneath the carousel 1210'. The release valve flow 1194 can then be redirected toward the occluding member 1218' and on to the ejector passages 1198, 1199, as indicated by arrows 1196, 1197. In other respects, the structure, operation and function of the carousel 1210' can be the same as or similar to the carousel 1210 of FIG. 5A.

In some cases, the entire end surface is planar (e.g., FIG. 5B) and in other cases, only a portion of the end surface is planar (e.g., FIG. 5A). Although the illustrated arrangements include an end surface configuration having a single planar portion, in some embodiments, the occluding portion 1218 can have multiple ramped surfaces falling within multiple planes, continuous smooth contours, or any other appropriate profile for selectively and/or differentially occluding the ejector passages 1198, 1199 upon changes in rotational position of the carousel. In addition, surfaces other than an end surface can define the variable nature of the occluding portion. For example, one or more slots in a side wall of the carousel 1210, 1210' could include a surface that defines the variable nature of the occluding portion.

In any case, it is preferred that the obstruction portions of the carousel 1210, 1210' at any particular point in time are diametrically opposed from one another. With such an arrangement, the obstruction portions are located along a diametrical axis, or line passing through the rotational axis, of the carousel 1210, 1210'. Accordingly, forces applied to the carousel 1210, 1210' by the pressurized ejection gas does not apply a moment to the carousel 1210, 1210' and, therefore, does not tend to rotate the carousel 1210, 1210'. Thus, the motor or other positioning mechanism for the carousel 1210, 1210' does not need to resist forces applied by the pressurized ejection gas. In addition, such an arrangement permits excellent positional accuracy of the carousel 1210, 1210' throughout the store ejection process.

The pitch control valve 1200 preferably is configured such that the carousel 1210 can be rotated to adjust the degree to which the occluding portion 1218 blocks each of the ejector passages 1198 and 1199. Accordingly, the pitch control valve 1200 can include a rotational input feature, which is driven by a drive or drive unit. In some embodiments, the rotational input feature is a gear, such as a ring gear or set of annular gear teeth 1212. The annular gear teeth 1212 can be configured to engage with teeth 1236 on a driving gear 1234 driven by a drive or drive unit, such as a motor 1230. In some embodiments, the motor 1230 can be used to rotate the carousel 1210. The motor 1230 can be an electric motor (e.g., a stepper motor). Rotation of the carousel 1210 can enable the occluding portion 1218 to occlude one ejector passage 1198 to a greater extent than another ejector passage 1199, and vice versa. Varying the occlusion between one ejector passage 1198 and another ejector passage 1199 can cause one ejector piston to extend at a different rate than another ejector piston. Varying extension rates between the ejector pistons 1301, 1302 can cause an aircraft store to be ejected from the aircraft at a predetermined pitch with respect to the aircraft. For example, increasing the occlusion of a forward ejector passage with respect to a rear ejector passage can cause the forward ejector piston to extend at a higher rate and/or acceleration than the rear ejector piston. In such a situation, the store would be ejected from airframe with a downward pitch (e.g., the front of the store would be further from the aircraft than the rear of the store). By rotating the carousel 1210, many different occlusion distributions between the ejector passages 1198, 1199 can be achieved and thus many different pitch configurations can be achieved for ejecting the store.

In some embodiments, the pitch control valve 1200 is controlled by signals from the aircraft sensor and/or weapon control systems to select, in-flight and at any time up to immediately prior to release of the store, the optimized pitch settings to accurately and safely compensate for perturbations caused by aircraft maneuver during the store separation. In some embodiments, the pitch control valve 1200 can be controlled by a pilot or other person while the aircraft is on the ground or in flight via a control interface in the cockpit or elsewhere. The motor 1230 can include one or more input ports 1232 to facilitate powering of and/or control of the pitch control valve 1200. In some embodiments, the pitch control valve 1200 and/or motor 1230 can be wirelessly controlled.

Figure 6A:
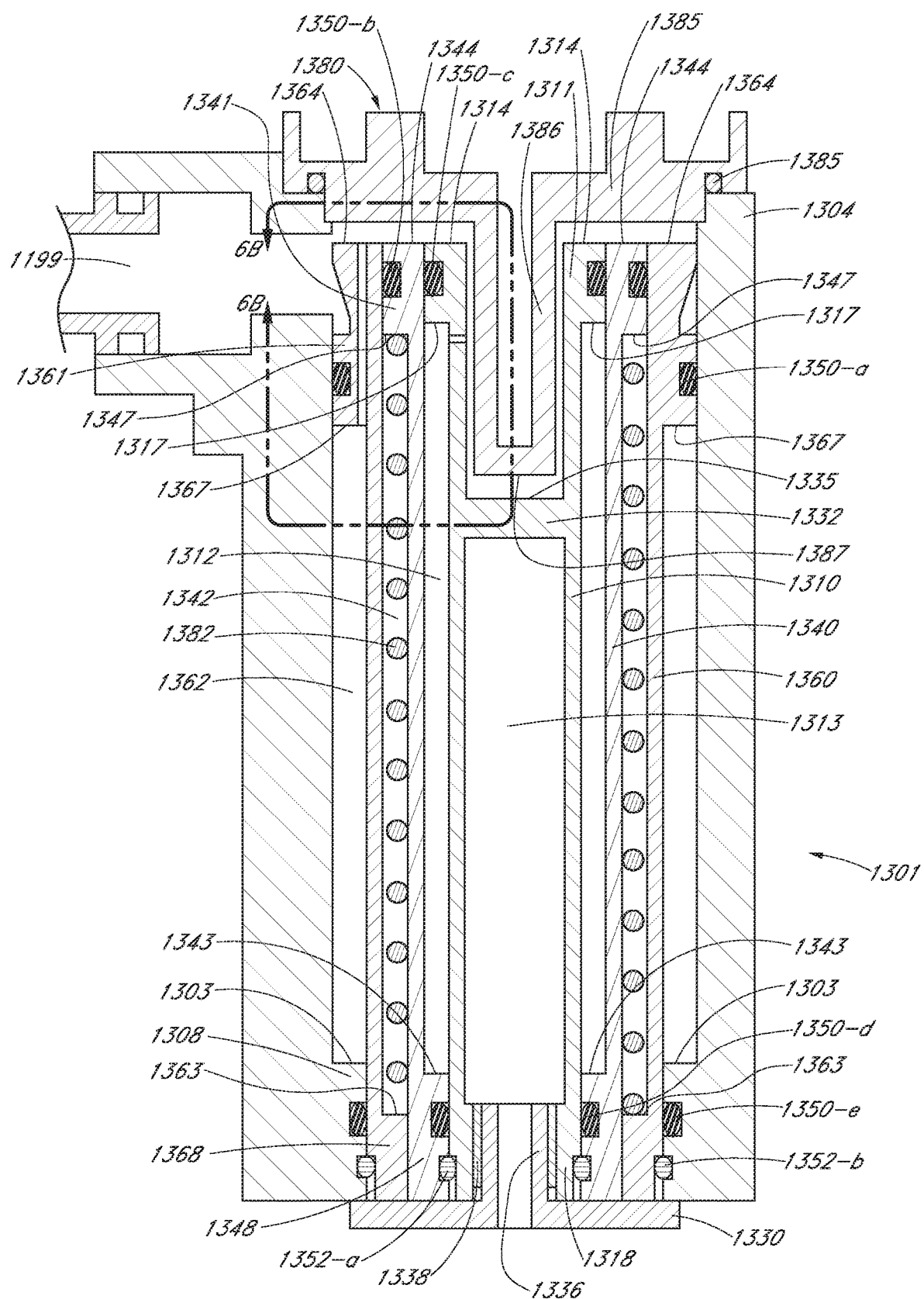
FIG. 6A illustrates a cross-sectional view of an ejector piston in a retracted position.

In some embodiments, pressurized gas that passes through pitch control valve 1200 is directed to one or more ejector pistons 1301, 1302 via one or more ejector passages 1198, 1199. FIG. 6A illustrates an embodiment of an ejector piston 1301. The discussion of ejector piston 1301 and the features described therein can equally apply to the ejector piston 1302 and/or any other ejector piston described in the present disclosure. The ejector piston 1301 can be housed within an ejector piston housing 1304. The ejector piston 1301 can generally comprise one or more piston stages. In some embodiments, the one or more piston stages can be connected to each other telescopically. In some embodiments, the ejector piston 1301 includes a ram member or ram 1330. The ram 1330 can be connected to the bottom (e.g., furthest from the airframe—the bottom of FIG. 6A) of the inner-most ejector stage to contact the store.

In some embodiments, the ejector piston 1301 includes an outer piston stage 1360. The outer piston stage 1360 can have a generally cylindrical shape, an axial centerline, an inner surface, an outer surface, and an axial length. In some embodiments, the outer piston stage 1360 includes an outward projection 1361. The outward projection 1361 can be an annular collar at or near the top (e.g., furthest from the ram 1330—the top of FIG. 6A) of the outer piston stage 1360. In some embodiments, an annular groove can be cut into the outside (e.g., the side furthest from the axial centerline of the outer piston stage 1360) of the outward projection 1361 between an upper end and a sealing portion. One advantage of taking a cut out of the outward projection 1361 can be a reduction in the weight of the ejector piston 1301. Another advantage can be a reduction of contact area (and thereby friction) between the outside surface of the outward projection 1361 and the inside surface of the ejector piston housing 1304.

The outward projection 1361 and/or outer piston stage 1360 can include a groove with a sealing member 1350-a. The sealing member 1350-a can be an O-ring or other appropriate sealing structure or method. The sealing member 1350-a can provide at least a substantial seal between the outward projection 1361 and the ejector piston housing 1304. In some embodiments, the ejector piston housing 1304 includes a sealing member 1350-e. In some embodiments, the sealing member 1350-e is located within an annular groove in an inwardly-projecting (e.g., toward the axial centerline of the outer piston stage) annular collar 1308. In some embodiments, the sealing member 1350-e and/or annular collar 1308 are located near the bottom of the ejector piston housing 1304. The sealing member 1350-e can be an O-ring or other appropriate sealing member or method and can be configured to provide a substantial annular seal between the ejector piston housing 1304 and the outer piston stage 1360. In some embodiments, the inwardly-projecting annular collar 1308 and the outward projection 1361 can have approximately the same radial thickness.

In some embodiments, the ejector piston 1301 includes one or more intermediate piston stages. As illustrated in FIG. 6A, the ejector piston 1301 can include an intermediate piston stage 1340 having a generally cylindrical shape, an axial centerline, an inner surface, an outer surface, and an axial length. The intermediate piston stage 1340 can have an axial length greater than or less than the axial length of the outer piston stage 1360. In some embodiments, the intermediate piston stage 1340 can have the same or approximately the same axial length as the outer piston stage 1360. In some embodiments, the outer cross-sectional dimension of the outer surface of the intermediate piston stage 1340 is smaller than the inner cross-sectional dimension of the outer surface of the outer piston stage 1360.

The intermediate piston stage 1340 can have an outwardly-projecting feature 1341. In some embodiments, the outwardly-projecting feature 1341 is an outwardly-projecting annular collar. The outwardly-projecting feature 1341 can be located at or near the top of the intermediate piston stage 1340. The intermediate piston stage 1340 can include a sealing member 1350-*b*. In some embodiments, the sealing member 1350-*b* is an O-ring or some other appropriate sealing member or method. The sealing member 1350-*b* can be configured to provide a substantial annular seal between the intermediate piston stage 1340 and the outer piston stage 1360. The sealing member 1350-*b* can be located in a groove on the outward (e.g., away from the axial centerline of the intermediate piston stage 1340) face of the outwardly-projecting feature 1341. In some embodiments, the outer piston stage 1360 can include an inward collar 1368. The inward collar 1368 can include a sealing member. In some embodiments, the sealing member is an O-ring or some other suitable sealing feature or method. The sealing member on the inward collar 1368 can be configured to create a substantial annular seal between the intermediate piston stage 1340 and the outer piston stage 1360. However, in the illustrated arrangement, the inward collar 1368 does not include a sealing member because a seal between the outer piston stage 1360 and the intermediate piston stage 1360 is not necessary because, preferably, a mechanical retraction member is provided between the outer piston stage 1360 and intermediate piston stage 1360 and gas pressure is not relied on for retraction. Retraction of the pistons 1301, 1302 is discussed further below. In some embodiments, the inward collar 1368 and the outwardly-projecting feature 1341 have approximately the same radial thickness.

In some embodiments, the ejector piston 1301 includes an inner piston stage 1310. The inner piston stage 1310 can have substantially cylindrical shape, an axial centerline, an inner surface, an outer surface, and an axial length. In some embodiments, the cross-sectional dimension of the outer surface of the inner piston stage 1310 is smaller than the cross-sectional dimension of the inner surface of the adjacent intermediate piston stages (e.g., intermediate piston stage 1340). Furthermore, in some embodiments, the axial length of the inner piston stage 1310 is greater than or less than the axial length of the outer piston stage 1360. In some embodiments, the inner piston stage 1310 has substantially the same axial length as one or more of the intermediate piston stages and/or the outer piston stage 1360.

As illustrated in FIG. 6A, the inner piston stage 1310 can include an outer collar 1311. The outer collar 1311 can be located at or near the top of the inner piston stage 1310. In some embodiments, the inner piston stage 1310 includes a sealing member 1350-*c*. The sealing member 1350-*c* can be an O-ring or some other suitable sealing feature or method. In some embodiments, the sealing member 1350-*c* can be configured to engage with a groove in the outer surface of the outer collar 1311. The sealing member 1350-*c* can be configured to create a substantial annular seal between the inner piston stage 1310 and the intermediate piston stage 1340. In some embodiments, the intermediate piston stage 1340 can include an inward feature 1348. The inward feature 1348 can include a sealing member 1350-*d*. In some embodiments, the sealing member 1350-*d* is an O-ring or some other suitable sealing feature or method. The sealing member 1350-*d* on the inward feature 1348 can be configured to create a substantial annular seal between the intermediate piston stage 1340 and the inner piston stage 1310. In some embodiments, the inward feature 1348 and the outer collar 1311 can have substantially the same radial thickness.

In some embodiments, the inner piston stage 1310 is configured to engage with the ram 1330. The ram 1330 can have axial centerline, an inner surface, an outer surface, and/or an axial length. In some embodiments, the ram 1330 can be configured to attach to the bottom of the inner piston stage 1310 via welding, adhesives, friction fitting, threaded engagement, or any other method or combination of methods of adhering. In some embodiments, the ram 1330 includes an axial projection 1336. The axial projection 1336 can have an outer surface. In some embodiments, the axial projection 1336 has an inner surface. The axial projection 1336 can include an outer (e.g., furthest from the axial centerline of the axial projection) surface configured to engage with the inner surface of the inner piston stage 1310. In some embodiments, axial projection 1336 engages with the inner piston stage 1310 at or near the bottom of the inner piston stage 1310. In some embodiments, an attachment member or arrangement 1338 can be provided between the outer surface of the axial projection 1336 and the inner surface of the inner piston stage 1310. In some such embodiments, the attachment member or arrangement 1338 can be configured to couple the axial projection 1336 and the inner piston stage 1310 via friction fit, adhesives, welding, threaded engagement, or any other suitable method or combinations of methods of adhering. In some embodiments, the inner piston stage 1310 includes an inward projection 1318. The inward projection 1318 can be an inwardly-projected annular collar. The inner surface of the inward projection 1318 can be configured to adhere to the attachment member 1338 and/or to the axial projection 1336.

In some embodiments, the ejector piston housing 1304 includes a housing cap 1380. The housing cap 1380 can be configured to connect to the top of the ejector piston housing 1304 via adhesives, welding, friction fit, threaded engagement, any suitable type of fastener, or any other suitable connection method or combination of methods. In some embodiments, the housing cap 1380 is configured to connect to the wing, fuselage, or other portion of an aircraft, either directly or through an appropriate intermediate mounting structure. The housing cap 1380 can have a seal portion 1385. The seal portion 1385 can have an outer surface and can be configured to engage with the top (top of FIGS. 6A-6E) end of the ejector piston housing 1304. Engagement between the seal portion 1385 and the top end of the ejector piston housing 1304 can create a seal or inhibit fluid communication between the interior of the ejector piston housing 1304 and the ambient surroundings of the ejector piston housing 1304. The seal portion 1385 of the housing cap 1380 can have a lower surface 1388 generally parallel to and facing one or more top surfaces 1314, 1344, and 1364 of the piston stages 1310, 1340, and 1360, respectively. In some embodiments, the housing cap 1380 includes a downward projection 1386. The downward projection 1386 can have a generally cylindrical shape, an axial centerline, an inner surface, an outer surface, and/or an axial length. In some embodiments, the downward projection 1386 is configured to fit within the top of the inner piston stage 1310. In some such embodiments, the cross-sectional dimension of the outer surface of the downward projection 1386 is smaller than the cross-sectional dimension of the inner surface of at least a portion of the inner piston stage 1310.

In some embodiments, the inner piston stage 1310 includes a dividing wall or transverse portion 1332. The transverse portion 1332 can have a thickness in an axial direction suitable to accommodate internal system pressures. For example, the transverse portion 1332 can have an axial thickness of equal to or over more than about 2% of the axial length of the inner piston stage 1310 and/or less than or equal to about 20% of the axial length of the inner piston stage 1310. In some embodiments, the transverse portion 1332 has an axial length of equal to over approximately 4% of the axial length of the inner piston stage 1310. Many variations are possible. The transverse portion 1332 can be located at any point along the axial length of the inner piston stage 1310 that creates a desirable volume above the transverse portion 1332. In some embodiments, the transverse portion 1332 can be located approximately 30% of the axial length of the inner piston stage 1310 away from the top 1314 of the inner piston stage 1310. In some embodiments, the transverse portion 1332 can be located more than 30% (e.g., 40%, 50% or 60%) of the axial length of the inner piston stage 1310 away from the top 1314 of the inner piston stage 1310. In some embodiments, the transverse portion 1332 can be located less than 30% (e.g., 10%, 15%, 20% or 25%) of the axial length of the inner piston stage 1310 away from the top 1314 of the inner piston stage 1310. Many variations are possible.

Figure 6B:
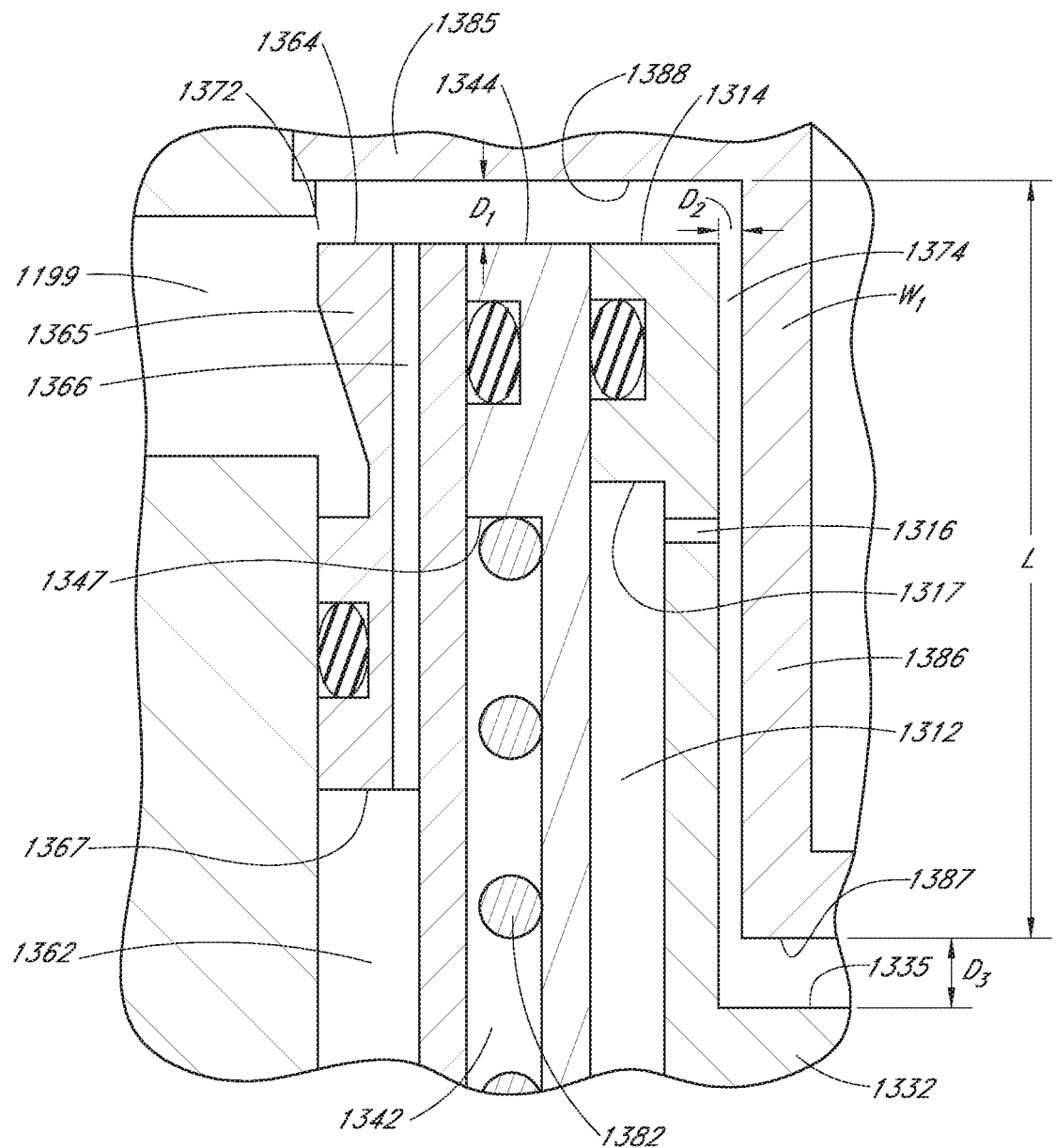
FIG. 6B illustrates an enlarged cross-sectional view of the ejector piston taken along line 6B-6B of FIG. 6A.
Figure 6C:
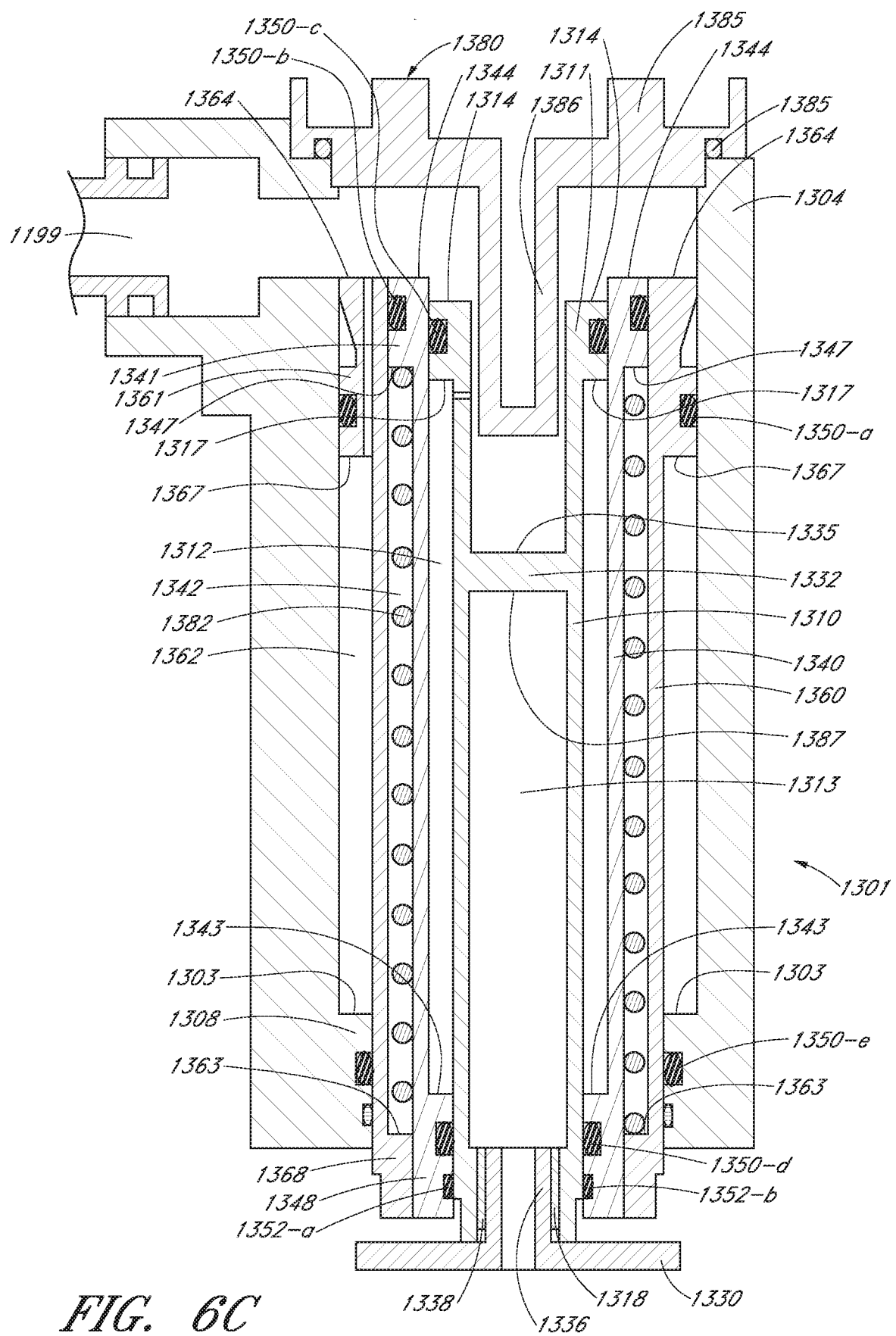
FIG. 6C illustrates a cross-sectional view of the ejector piston of FIG. 6A in a partially-extended position.
Figure 6D:
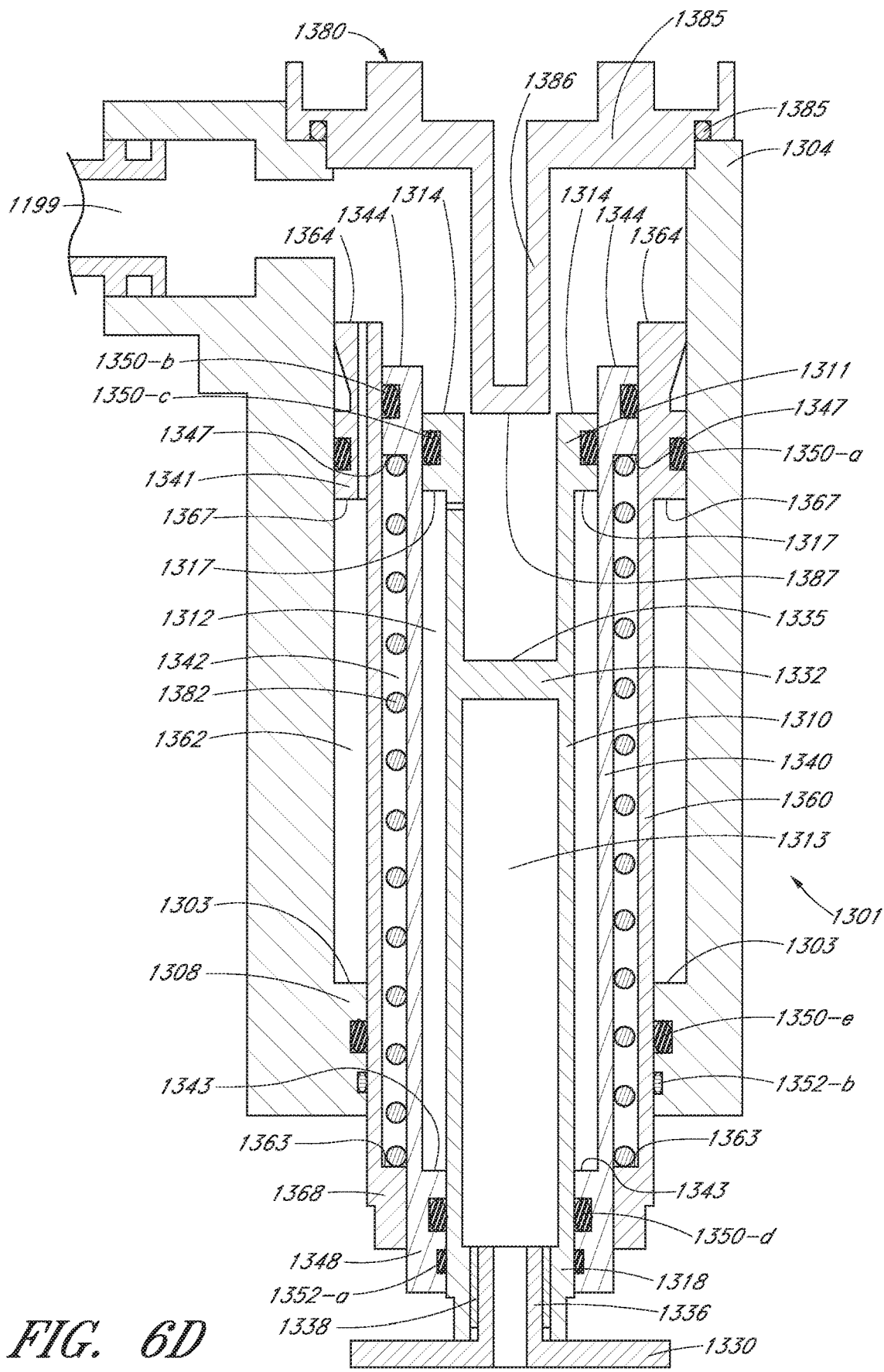
FIG. 6D illustrates a cross-sectional view of the ejector piston of FIG. 6A in a partially-extended position.
Figure 6E:
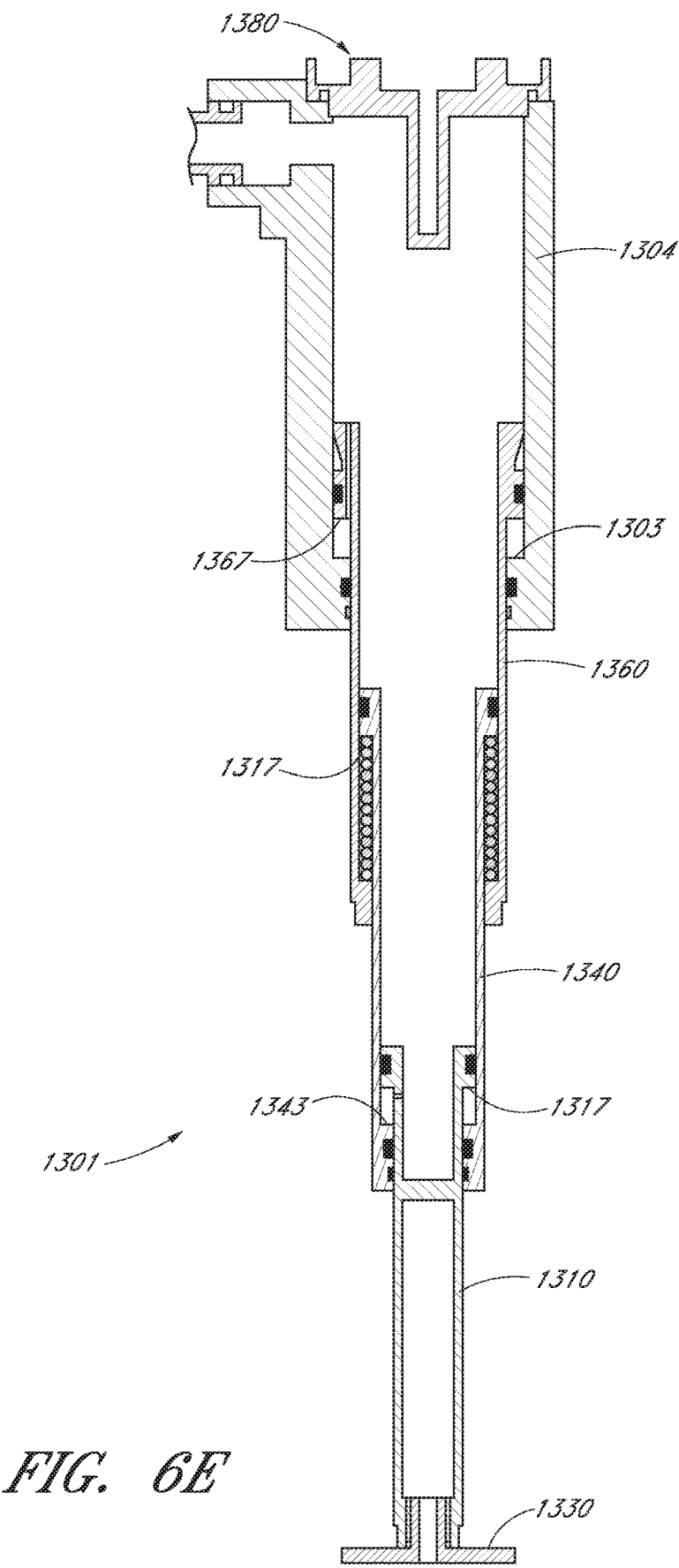
FIG. 6E illustrates a cross-sectional view of the ejector piston of FIG. 6A in a fully-extended position.

As illustrated in FIGS. 6A-6E, the outer piston stage 1360 can include a piston entrance 1372, such as an opening or port (FIG. 6B). The piston entrance 1372 can be located at or near the interface between the ejector passage 1199 and the ejector piston housing 1304. In some embodiments, the outer piston stage 1360 includes an occluding projection 1365. The occluding projection 1365 can be configured to constrict or occlude passage of high pressure gas through the piston entrance 1372 into the piston housing 1340 or space above the piston stages 1310, 1340, 1360. Constricting or otherwise impeding the flow of high pressure gas into the piston housing 1340 can reduce the rate at which each of the piston stages 1310, 1340, 1360 transitions and/or accelerates from a retracted position (e.g., held within the housing 1304, as illustrated in FIG. 6A) to an extended position (e.g., fully extended from the housing 1304, as illustrated in FIG. 6E). Furthermore, impeding the flow of high pressure gas into the ejector piston housing 1304 can reduce rate of pressure loading on the housing cap 1380 and/or on the ejector piston housing 1304. In some embodiments, the occluding effect of the occluding projection 1365 is reduced as the outer piston stage 1360 moves downwardly and preferably is eliminated when the top surfaces 1314, 1344, 1364 of the piston stages 1310, 1340, 1360 pass the lower edge of the ejector passage 1199, as illustrated in FIG. 6C, such that the rate of acceleration of the piston stages 1310, 1340, 1360 toward the expanded position increases.

Flow of high pressure gas from the ejector passage 1199 can be further occluded by reducing the distance D1 (FIG. 6B) between the upper surfaces 1314, 1344, 1364 of the piston stages 1310, 1340, 1360 and the lower surface 1388 of the housing cap 1380. Variations in the distance D1 can affect the rate at which high pressure gas is able to reach the downward projection 1386, the transverse portion 1332, and/or the full annuli of the upper surfaces 1314, 1344, 1364. In some embodiments, variation in the distance D1 can affect the rate at which each of the piston stages 1310, 1340, 1360 transition from the retracted position to the extended position. In some embodiments, limiting the rate at which high pressure air reaches the upper surfaces 1314, 1344, 1364 of the piston stages 1310, 1340, 1360 and the lower surface of the 1388 of the housing cap 1380 can lower the initial acceleration of the piston stages 1310, 1340, 1360 toward the extended position. In some such embodiments, lowering the initial acceleration of the piston stages 1310, 1340, 1360 can help reduce impact on the housing cap 1380 and/or the airframe as the piston stages 1310, 1340, 1360 extend. As the piston stages 1310, 1340, 1360 move from the retracted position toward the extended position, the distance D1 is increased.

Decreasing the radial distance D2 (FIG. 6B) between the outer surface of the downward projection 1386 and the inner surface of the inner piston stage 1310 can further occlude or constrict the flow of high pressure gas from the ejector passage 1199 to the upper surface 1335 of the transverse portion 1332 and to the lower surface 1387 of the downward projection 1386. Occluding, constricting, or otherwise delaying flow through the radial space between the downward projection 1386 and the inner piston stage 1310 can delay the pressurization of the space between the lower surface 1387 of the downward projection 1386 and the upper surface 1335 of the transverse portion 1332. Such a delay can reduce the acceleration of the inner piston stage 1310 toward the extended position. Furthermore, such a delay can reduce the rate at which the upward force upon the lower surface 1387 of the downward projection 1386 is increased upon introduction of high pressure gas to the ejector passage 1199 from the pitch control valve 1200.

In some embodiments, increasing the distance D3 between the lower surface 1387 of the downward projection 1386 and the upper surface 1335 of the transverse portion 1332 can increase the time required pressurize the space between the two surfaces. Such an increase in the time required for pressurization can reduce the acceleration of the inner piston stage 1310 toward the extended position. Furthermore, such an increase can reduce the rate at which the upward force upon the lower surface 1387 of the downward projection 1386 is increased upon introduction of high pressure gas to the ejector passage 1199 from the pitch control valve 1200. Conversely, reducing the distance D3 can increase the acceleration of the inner piston stage 1310 toward the extended position and/or can increase the rate at which the upward force upon the lower surface 1387 of the downward projection is increased upon introduction of high pressure gas to the ejector passage 1199 from the pitch control valve 1200. In preferred embodiments, the transverse wall 1332 is located at a spaced located from a lower end of the inner piston stage 1310 such that the filling time of the interior chamber of the inner piston stage 1310 is less than prior art arrangements in which the interior chamber extends the entire length or substantially the entire length of the piston.

In some embodiments, the axial length L of the downward projection 1386 can affect the rate of acceleration of the inner piston stage 1310 toward the extended position. As described above, the radial distance D2 between the outer surface of the downward projection 1386 and the inner surface of the inner piston stage 1310 can impede the passage of high pressure gas from the ejector passage 1199 to the space between the upper surface 1335 of the transverse portion 1332 and the lower surface 1387 of the downward projection 1386. The occlusive effect of the radial distance D2 can be substantially reduced and/or eliminated when the top surface 1314 of the inner piston stage 1310 passes the lower surface 1387 of the downward projection 1386, as illustrated in FIG. 6D. In some embodiments, increases in the axial length L of the downward projection 1386 increase the time required for the top surface 1314 of the inner piston stage 1310 to pass the lower surface 1387 of the downward projection 1386. In some such embodiments, the time required for the inner piston stage 1310 to transition from the retracted position to the extended position is increased. In some embodiments, decreases in the axial length L of the downward projection 1386 can decrease the time required for the inner piston stage 1310 to transition from the retracted position to the extended position.

As illustrated and described, variations in the axial length L of the downward projection 1386, the distance D1, the radial distance D2, and the distance D3 can each have an effect on the pressure profiles (e.g., the pressure magnitude as a function of time) exerted upon the surfaces of the piston 1301 over the course of a single piston stroke. Similarly, changes in the above dimensions can each have an effect on the pressure profiles exerted upon the housing cap 1380. Thus, the specific loadings, accelerations, etc. experienced by the ejection system 1300 during the extension and/or retraction processes can be customized to fit desired performance parameters (e.g., rate of extension, acceleration, etc.) by modifying the dimensions L, D1, D2, and/or D3, among other parameters.

In some embodiments, the outer piston stage 1360 includes an outer bleed passage 1366 (FIG. 6B). The outer bleed passage 1366 can be configured to provide fluid communication between the ejector passage 1199 and an outer piston chamber 1362. The outer piston chamber 1362 can be an annular chamber, semiannular chamber, or other-shaped chamber. In some embodiments, the outer piston chamber 1362 is defined by the outer wall of the outer piston stage 1360, the inner wall of the ejector piston housing 1304, a lower surface 1367 of the outward projection 1361, and an upper surface 1303 of the inwardly-projecting annular collar 1308. Furthermore, in some embodiments, the inner piston stage includes an inner bleed passage 1316. The inner bleed passage 1316 can be configured to provide fluid communication between the ejector passage 1100 and an inner piston chamber 1312. The inner piston chamber 1312 can be an annular chamber, semiannular chamber, or other-shaped chamber. The inner piston chamber 1312 can be defined by outer surface of the inner piston stage 1310, the inner surface of the intermediate piston stage 1340, a lower surface 1317 of the outer collar 1311, and an upper surface 1343 of the inward feature 1348.

The outer piston chamber 1362 and inner piston chamber 1312 are provided with pressurized gas via the respective bleed passages 1366, 1316 during extension of the pistons 1301, 1302 and ejection of the store. The bleed passages 1366, 1316 are sized to limit the mass and therefore pressure of the gas introduced to the chambers 1362, 1312. As the ejector piston 1301 transitions from the retracted position to the extended position, the distance between the lower surface 1367 and the upper surface 1303 is decreased. Decreasing the distance between the lower surface 1367 and the upper surface 1303 decreases the volume of the outer piston chamber 1362, which can compress the gas within the outer piston chamber 1362 that is introduced into the outer piston chamber 1362 through the outer bleed passage 1366. In some such embodiments, the compressed gas within the outer piston chamber 1362 can behave as a gas spring at the end of the extension of the outer piston stage 3160 to inhibit or prevent direct contact between the outward projection 1361 and the annular collar 1308. Similarly, transition of the ejector piston 1301 to the extended position also decreases the distance between the lower surface 1317 and the upper surface 1343. Such a decrease in distance decreases the volume of the inner piston chamber 1312, thus compressing the gas in the inner piston chamber 1312. Preferably, the compressed gas within the inner piston chamber 1312 behaves as a gas spring at the end of the extension of the inner piston stage 3110 to inhibit or prevent direct contact between the outer collar 1311 and the inward feature 1348. Upon venting of the ejector passage 1199 via the vent valve 1120, the compressed gas within the outer piston chamber 1362 and inner piston chamber 1312 can force the outer piston stage 1360 and inner piston stage 1310, respectively, to retract into the piston housing 1304.

In some embodiments, an intermediate piston chamber 1342 is defined by the outer wall of the intermediate piston stage 1340, the inner wall of the outer piston stage 1360, a lower surface 1347 of the outwardly-projecting feature 1341, and an upper surface 1363 of the inward collar 1368. In some embodiments, a bleed passage can connect the intermediate piston chamber 1342 to the ejector passage 1199 in a manner to that described above with respect to bleed passages 1316 and 1366. However, in some cases, providing a bleed passage to the intermediate piston chamber 1342 can prove difficult in practice. Therefore, in certain variants, one or more of the piston chambers 1312, 1342, 1362 includes a resilient member to provide for retraction. For example, in the illustrated arrangement, the intermediate piston chamber 1342 houses a resilient retraction member 1382. In some embodiments, the resilient retraction member 1382 can be a compression spring. The resilient retraction member 1382 can serve some or all of the same functions explained above for the compressed gas within the inner piston chamber 1312 and the outer piston chamber 1362. For example, as the intermediate piston stage 1340 transitions to the extended position, the distance between the lower surface 1347 and the upper surface 1363 decreases. As this distance decreases, the resilient retraction member 1382 is compressed. The compressed resilient retraction member 1382 can serve as a shock absorber at the end of the extension of the intermediate piston stage 1340. In addition, the compressed resilient retraction member 1382 provides a force that moves or tends to move the intermediate piston stage 1340 to the retracted position when the high pressure gas within the ejector passage 1199 is vented via the vent valve 1120. Thus, in the illustrated arrangement, the retraction arrangements of the piston chambers alternate between gas spring and a non-gas spring, such as compression spring, for example. Preferably, the outermost piston chamber (e.g., chamber 1362) is a gas spring and the chambers alternate moving inwardly. The innermost piston chamber (e.g., 1312) can also be a gas spring regardless of where it falls within the alternating pattern because it is typically practical to provide a bleed passage to the innermost piston chamber. In certain variants, each of the piston chambers 1312, 1342, 1362 could include a non-gas resilient retraction member. In other variants, none of the piston chambers 1312, 1342, 1362 include a non-gas resilient retraction member.

In operation, the system 10 can be used to cause ejection of a store from an associated aircraft. Preferably, the remote reservoir 1002 and local reservoir(s) 1004 are charged to a desirable pressure level on the ground or otherwise prior to the point in time in which it is desired to eject the store. If necessary or desirable, the local reservoir(s) 1004 can be "topped-off" or increased in pressure via the pressure intensifier 1006 using pressurized gas from the remote reservoir 1002. The pitch control valve 1200 can be adjusted if necessary or desired to adjust the ejection force applied to the front and rear of the store. Once a command to release the store is issued, pressurized gas from the remote reservoir 1004 is supplied to the associated ejection system 1300 by opening of the release valve 1100. Furthermore, the pistons 1301 and 1302 are extended in response to the pressurized gas and apply an ejection force to the store. Once the store is released, the release valve 1100 is closed, which permits the pistons 1301 and 1302 to retract. If desired, the local reservoir(s) 1004 can be recharged with pressurized gas from the remote reservoir 1002. This process can be repeated, if desired. For example, the remote reservoir 1002 can be configured to provide multiple recharging cycles (e.g., at least 2 or 3-10 cycles, or more).

Figure 7:
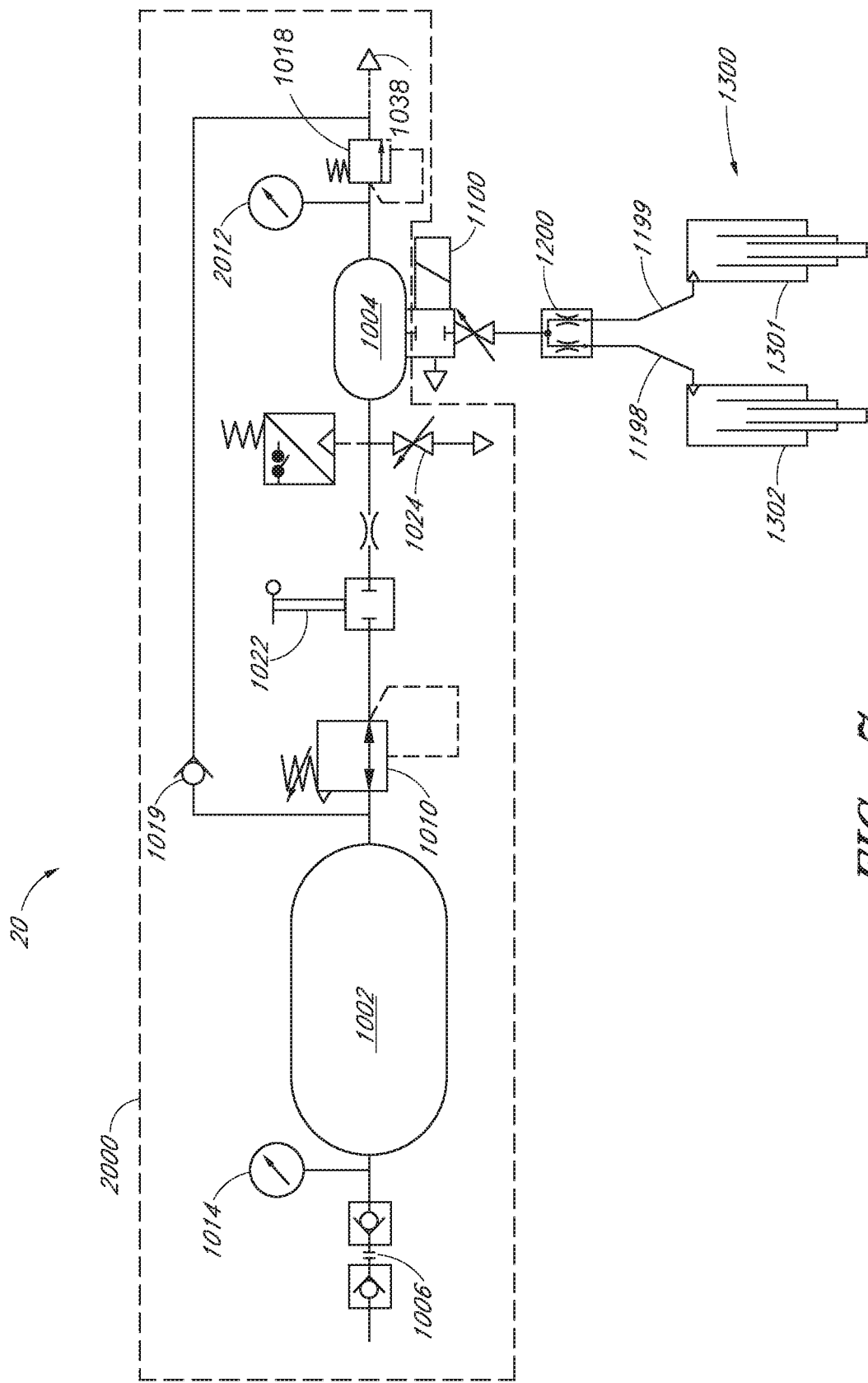
FIG. 7 illustrates a pneumatic circuit representation of an embodiment of the aircraft store ejector system, which is a modification of the system of FIGS. 1-6.

In some embodiments of an aircraft store ejector system 20, as illustrated in FIG. 7, the remote reservoir 1002 is connected to the local reservoir 1004 without the use of an intermediate pressure intensifier. In some such embodiments, the local reservoir 1004 can be re-pressurized directly from the remote reservoir 1002 via the pressure reducer 1010. In such arrangements, the other features can be as described above.

In some embodiments, an aircraft store ejector system 30 can include a re-pressurization system 3000 having an adjustable-volume remote reservoir 3002. The adjustable remote reservoir 3002 can include a pressure control member 3003. The pressure control member 3003 can be configured to modify the pressure within the adjustable remote reservoir 3002. In some embodiments, the pressure control member 3003 modifies the pressure within the adjustable remote reservoir 3002 by adjusting the volume of the adjustable remote reservoir. In some embodiments, the pressure control member 3003 is located partially within the adjustable remote reservoir 3002. In some embodiments, the entire pressure control member 3003 is located within the adjustable remote reservoir 3002. In some embodiments, the pressure control member 3003 is located outside the remote reservoir 3002.

Figure 8:
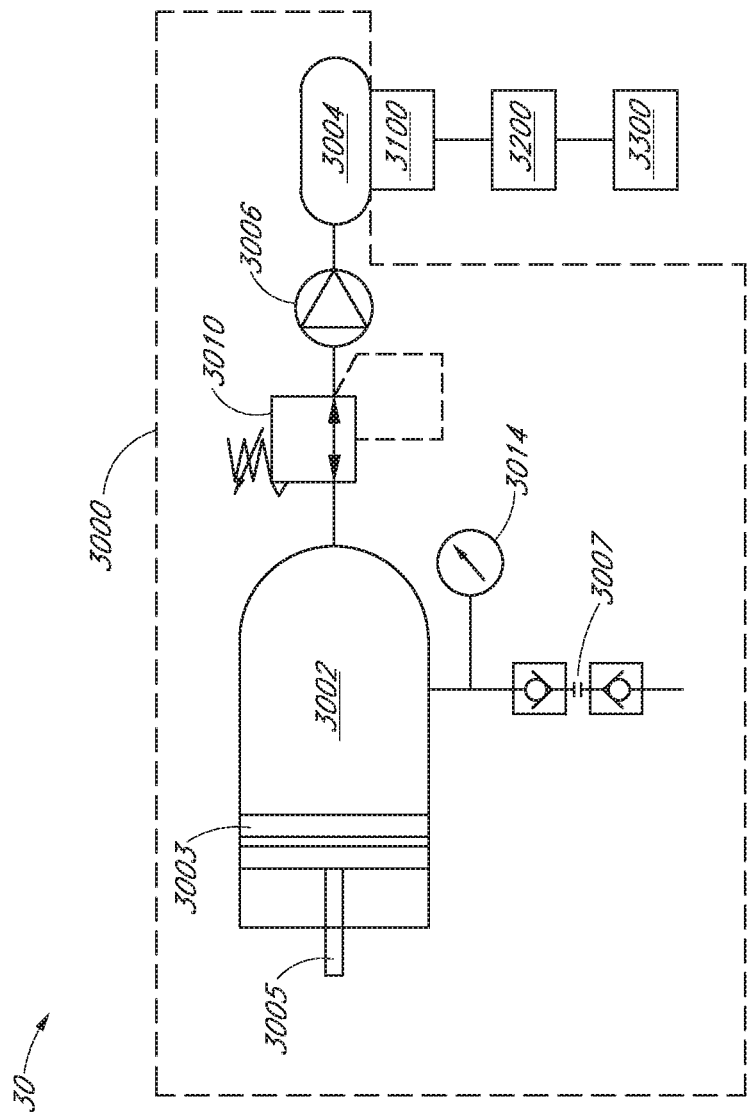
FIG. 8 illustrates a pneumatic circuit representation of an embodiment of the aircraft store ejector system, which is another modification of the system of FIGS. 1-6.

As illustrated in FIG. 8, the adjustable remote reservoir 3002 can include a actuating arrangement or member 3005. The actuating member 3005 can be configured to actuate the pressure control member 3003. For example, in some embodiments, the pressure control member 3003 is a plunger housed within the adjustable remote reservoir 3002. In some such embodiments, the actuating member 3005 could be a rod configured to move the plunger within the adjustable remote reservoir. The actuating arrangement could also be hydraulic fluid that is dedicated to the store ejection system 30 or that is used for other purposes on the aircraft. In other embodiments, the pressure control member can be any structure capable of adjusting the effective volume of the remote reservoir 3002, such as a collapsing diaphragm, for example. In some embodiments, the activation of the actuating member 3005 can be controlled by pressure control software. For example, the pressure control software can be configured to command the actuating member 3005 to increase and/or decrease the volume of the adjustable remote reservoir 3002 to bring the gas within the adjustable remote reservoir 3002 to a pre-determined pressure level.

In some embodiments, the adjustable remote reservoir 3002 can be configured to receive a charge of pressurized gas via a charge port 3007. In some embodiments, the adjustable remote reservoir 3002 is configured to be charged while the aircraft in which it is installed is on the ground or while the aircraft is in the air. A pressure indicator or gage 3014 can be provided to indicate system pressure at the location of the gage 3014. The adjustable remote reservoir 3002 can connect to a local reservoir 3004 via an intermediate pressure reducer 3010 and/or an intermediate pressure intensifier 3006. The pressure reducer 3010 and pressure intensifier 3006 can be configured to function similarly or the same as the pressure reduce 1010 and pressure intensifier 1006, respectively, described above. Similarly, the re-pressurization system 3000 can connect to a release valve 3100, pitch control valve 3200, and/or an ejection system 3300. The release valve 3100, pitch control valve 3200, and ejection system 3300 can operate similarly or the same as and/or have the same components as the release valve 1100, pitch control valve 1200, and ejection system 1300 described above, respectively. Furthermore, the re-pressurization system 3000 can be used with release valves, pitch control valves, and/or ejection systems other than those described herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present aircraft store ejector system, components and methods have been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. For example, the ejection system 1300 can be used in combination with one or more of the re-pressurization systems 1000, 2000, and/or 3000 or with an alternative re-pressurization system not disclosed in the present disclosure. Thus, it is intended that the scope of the present invention herein disclosed should not be limited by the particular disclosed embodiments described above, but should be determined only by a fair reading of the claims.

What is claimed is:

1. An aircraft store ejector system comprising:
   a pressurized gas arrangement;
   an ejection system configured to receive a flow of pressurized gas from the pressurized gas arrangement, the ejection system comprising a first ejector passage in fluid communication with a first ejector piston and a second ejector passage in fluid communication with a second ejector piston;
   a piston housing positioned at least partially between the first and second ejector passages of the ejection system, the piston housing comprising a body and one or more openings in the body, wherein the one or more openings are configured to provide fluid communication between at least one of the first and second ejector passages and an interior defined within the body, the piston housing further comprising one or more vent ports configured to provide fluid communication between at least one of the first and second ejector passages and ambient surroundings of the aircraft store ejector system; and a pitch control valve positioned around the piston housing and positioned at least partially within at least one of the first and second ejector passages, the pitch control valve configured to control the flow of pressurized gas to at least one of the first and second ejector passages, wherein the pitch control valve comprises a carousel configured to rotate about an axis extending through a center of the carousel, the carousel having an occluding portion, wherein the carousel is rotatable about the axis such that the occluding portion can variably obstruct the first and second ejector passages in fluid communication with the first and second ejector pistons.

2. The aircraft store ejector system of claim 1, wherein the piston housing further comprises an axis extending through a center of the body, and wherein the axis of the piston housing aligns with the axis extending through the carousel of the pitch control valve.

3. The aircraft store ejector system of claim 1, wherein the one or more openings of the piston housing comprises a first opening and a second opening.

4. The aircraft store ejector system of claim 3, wherein the first opening and the second opening are aligned with one another.

5. The aircraft store ejector system of claim 1, wherein the body of the piston housing is at least partially cylindrical.

6. The aircraft store ejector system of claim 1, wherein the occluding portion comprises an obstruction wall.

7. The aircraft store ejector system of claim 6, wherein at least a portion of the body of the piston housing is spaced from the obstruction wall by a gap.

8. The aircraft store ejector system of claim 6, wherein the obstruction wall extends around less than an entire perimeter of the body of the piston housing.

9. An aircraft store ejector system comprising:

an ejection system configured to receive a flow of pressurized gas from a pressurized gas arrangement, the ejection system comprising one or more ejector passages in fluid communication with one or more ejector pistons;

a first valve comprising a body and one or more openings in the body, wherein the one or more openings are configured to provide fluid communication between the one or more ejector passages and an interior defined within the body; and a second valve positioned around the first valve and positioned at least partially within the one or more ejector passages, the second valve configured to control the flow of pressurized gas to the one or more ejector passages, wherein the second valve comprises a carousel configured to rotate about an axis extending through a center of the carousel, the carousel having an occluding portion, wherein the carousel is rotatable about the axis such that the occluding portion can variably obstruct the one or more ejector passages in fluid communication with the one or more ejector pistons;

wherein the first valve further comprises one or more vent ports configured to provide fluid communication between the one or more ejector passages and ambient surroundings of the aircraft store ejector system.

10. The aircraft store ejector system of claim 9, wherein the body of the first valve is at least partially cylindrical.

11. The aircraft store ejector system of claim 9, wherein the occluding portion extends at least partially within the one or more ejector passages.

12. The aircraft store ejector system of claim 9, wherein the one or more ejector passages comprises a first ejector passage and a second ejector passage.

13. The aircraft store ejector system of claim 12, wherein the first valve is positioned at least partially between the first and second ejector passages.

14. The aircraft store ejector system of claim 12, wherein the one or more openings of the first valve comprises a first opening and a second opening.

15. The aircraft store ejector system of claim 14, wherein the first opening and the second opening are aligned with one another.

16. The aircraft store ejector system of claim 9, wherein the body of the first valve is spaced from the occluding portion by a gap.

17. The aircraft store ejector system of claim 9, wherein the occluding portion comprises an obstruction wall extending around less than an entire perimeter of the body of the first valve.

18. The aircraft store ejector system of claim 9, wherein the occluding portion comprises an annular obstruction wall having a variable height along at least a portion of a perimeter of the annular obstruction wall.

19. The aircraft store ejector system of claim 9, wherein the occluding portion comprises an annular obstruction wall having a variable height along an entirety of a perimeter of the annular obstruction wall.

20. An aircraft store ejector system comprising:

an ejection system configured to receive a flow of pressurized gas from a pressurized gas arrangement, the ejection system comprising one or more ejector passages in fluid communication with one or more ejector pistons, wherein the one or more ejector passages comprises a first ejector passage and a second ejector passage;

a first valve comprising a body and one or more openings in the body, wherein the one or more openings are configured to provide fluid communication between the one or more ejector passages and an interior defined within the body, wherein the first valve is positioned at least partially between the first and second ejector passages; and a second valve positioned around the first valve and positioned at least partially within the one or more ejector passages, the second valve configured to control the flow of pressurized gas to the one or more ejector passages, wherein the second valve comprises a carousel configured to rotate about an axis extending through a center of the carousel, the carousel having an occluding portion, wherein the carousel is rotatable about the axis such that the occluding portion can variably obstruct the one or more ejector passages in fluid communication with the one or more ejector pistons.

21. An aircraft store ejector system comprising:

an ejection system configured to receive a flow of pressurized gas from a pressurized gas arrangement, the ejection system comprising one or more ejector passages in fluid communication with one or more ejector pistons;

a first valve comprising a body and one or more openings in the body, wherein the one or more openings are configured to provide fluid communication between the one or more ejector passages and an interior defined within the body; and a second valve positioned around the first valve and positioned at least partially within the one or more ejector passages, the second valve configured to control the flow of pressurized gas to the one or more ejector passages, wherein the second valve comprises a carousel configured to rotate about an axis extending through a center of the carousel, the carousel having an occluding portion, wherein the carousel is rotatable about the axis such that the occluding portion can variably obstruct the one or more ejector passages in fluid communication with the one or more ejector pistons, wherein the occluding portion comprises an annular obstruction wall having a variable height along an entirety of a perimeter of the annular obstruction wall.

* * * * *